United States Patent
Chen et al.

(10) Patent No.: US 8,514,501 B2
(45) Date of Patent: Aug. 20, 2013

(54) OPTICAL IMAGE LENS SYSTEM

(75) Inventors: Chun-Shan Chen, Taichung (TW);
Tsung-Han Tsai, Taichung (TW);
Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/584,778

(22) Filed: Aug. 13, 2012

(65) Prior Publication Data
US 2013/0077181 A1 Mar. 28, 2013

(30) Foreign Application Priority Data
Sep. 28, 2011 (TW) .............................. 100135041 A

(51) Int. Cl.
*G02B 3/02* (2006.01)
*G02B 9/60* (2006.01)

(52) U.S. Cl.
USPC ........... 359/714; 359/739; 359/763; 359/764; 359/765

(58) Field of Classification Search
USPC .................................. 359/714, 739, 763–765
See application file for complete search history.

(56) References Cited

U.S. PATENT DOCUMENTS

| | | | |
|---|---|---|---|
| 7,355,801 B2 | 4/2008 | Chen et al. | |
| 7,864,454 B1* | 1/2011 | Tang et al. | ..................... 359/764 |
| 8,339,718 B1* | 12/2012 | Tang et al. | ..................... 359/764 |
| 8,363,337 B2* | 1/2013 | Tang et al. | ..................... 359/764 |
| 8,456,757 B2* | 6/2013 | Tsai et al. | ..................... 359/714 |
| 2010/0315723 A1* | 12/2010 | Noda | ............................. 359/714 |
| 2011/0013069 A1* | 1/2011 | Chen | ............................. 359/714 |

* cited by examiner

*Primary Examiner* — Evelyn A. Lester
(74) *Attorney, Agent, or Firm* — CKC & Partners Co., Ltd.

(57) ABSTRACT

An optical image lens system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface and a convex image-side surface. The third lens element with negative refractive power has a concave image-side surface. The fourth lens element with refractive power has a concave object-side surface and a convex image-side surface, wherein the surfaces of the fourth lens element are aspheric. The fifth lens element with negative refractive power has a concave image-side surface, wherein the surfaces of the fifth lens element are aspheric, and the fifth lens element has inflection points formed on at least one of surface thereof.

23 Claims, 17 Drawing Sheets

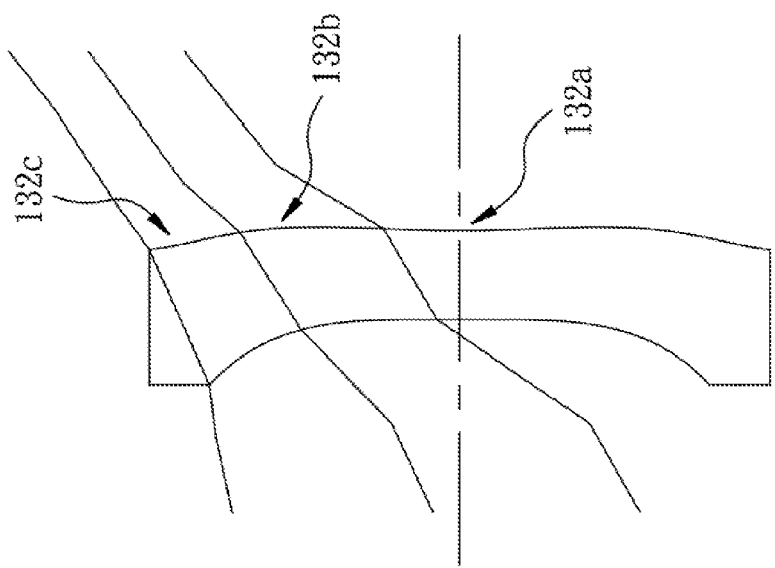

OPTICAL IMAGE LENS SYSTEM

RELATED APPLICATIONS

The application claims priority to Taiwan Application Serial Number 100135041, filed Sep. 28, 2011, which is herein incorporated by reference.

BACKGROUND

1. Technical Field

The present invention relates to an optical image lens system. More particularly, the present invention relates to a compact optical image lens system applicable to electronic products.

2. Description of Related Art

In recent years, with the popularity of mobile products with camera functionalities, the demand for miniaturizing an optical lens system is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure. Due to the popularity of mobile products with high-end specifications, such as smart phones and PDAs (Personal Digital Assistants), the pixel and image-quality requirements of the compact optical lens system have increased rapidly. However, the conventional four-element lens structure cannot satisfy the requirements of the compact optical lens system. Furthermore, the trend in modern electronics is developed toward higher performance and compact size. Therefore, a need exists in the art for providing an optical lens system for use in a mobile electronic product that has excellent imaging quality without excessive total track length.

SUMMARY

According to one aspect of the present disclosure, an optical image lens system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface and a convex image-side surface. The third lens element with negative refractive power has a concave image-side surface. The fourth lens element with refractive power has a concave object-side surface and a convex image-side surface, wherein the object-side surface and the image-side surface of the fourth lens element are aspheric. The fifth lens element with negative refractive power has a concave image-side surface, wherein an object-side surface and the image-side surface of the fifth lens element are aspheric, and the fifth lens element has at least one inflection point formed on at least one of the object-side surface and the image-side surface thereof. A curvature radius of the object-side surface of the third lens element is R5, a curvature radius of the image-side surface of the third lens element is R6, a central thickness of the second lens element is CT2, a central thickness of the third lens element is CT3, and an axial distance between the second lens element and the third lens element is T23, the following relationships are satisfied:

$0 < (R5+R6)/(R5-R6) < 5.0$; and $0.5 < (CT2+CT3)/T23 < 2.5$.

According to another aspect of the present disclosure, an optical image lens system comprising, in order from an object side to an image side, a first lens element, a second lens element, a third lens element, a fourth lens element and a fifth lens element. The first lens element with positive refractive power has a convex object-side surface. The second lens element with negative refractive power has a concave object-side surface and a convex image-side surface. The third lens element with negative refractive power has a concave object-side surface and a concave image-side surface, wherein the object-side surface and the image-side surface of the third lens element are aspheric. The fourth lens element with refractive power is made of plastic material, wherein an object-side surface and an image-side surface of the fourth lens element are aspheric. The fifth lens element with negative refractive power has a concave image-side surface, and is made of plastic material, wherein an object-side surface and the image-side surface of the fourth lens element are aspheric, and the fifth lens element has at least one inflection point formed on at least one of the object-side surface and the image-side surface thereof. A curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, a central thickness of the second lens element is CT2, a central thickness of the third lens element is CT3, and an axial distance between the second lens element and the third lens element is T23, the following relationships are satisfied:

$0 < (R5+R6)/(R5-R6) < 1.0$;

$0.5 < (CT2+CT3)/T23 < 2.5$; and $-1.0 < (R3 \times R6)/(R4 \times R5) < 0$.

BRIEF DESCRIPTION OF THE DRAWINGS

The invention can be more fully understood by reading the following detailed description of the embodiment, with reference made to the accompanying drawings as follows:

FIG. 17 is a schematic view of surface shape changes of the third lens element of the optical image lens system according to the 1st embodiment of the present disclosure.

DETAILED DESCRIPTION

Figure 1:
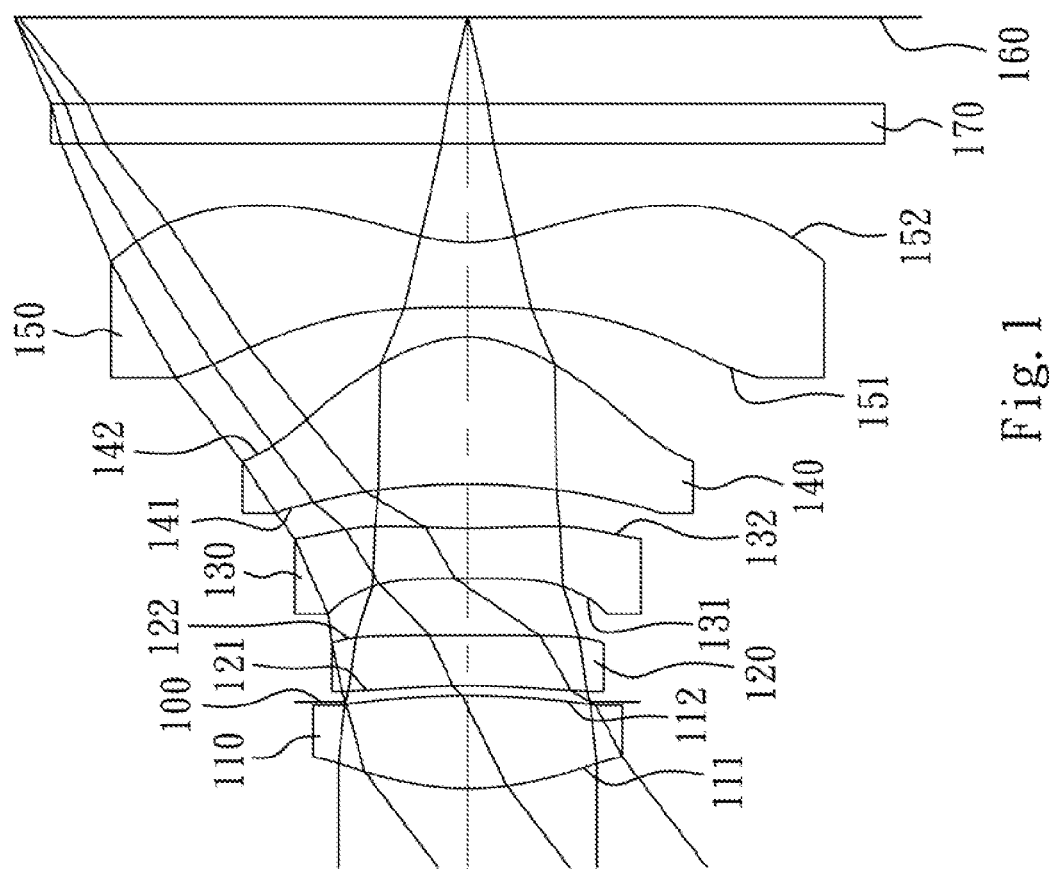
FIG. 1 is a schematic view of an optical image lens system according to the 1st embodiment of the present disclosure.

An optical image lens system includes, in order from an object side to an image side, a first lens element, a second lens element, a third lens element, a fourth lens element and a fifth lens element. The optical image lens system further includes an image sensor located on an image plane.

The first lens element with positive refractive power has a convex object-side surface, so that the total track length of the optical image lens system can be reduced. When the first lens element has a concave image-side surface, the astigmatism of the optical image lens system can be corrected while retaining the high image quality.

The second lens element with negative refractive power has a concave object-side surface and a convex image-side surface for correcting the aberration generated from the first lens element with positive refractive power.

The third lens element with negative refractive power complements the second lens element for reducing the high order aberration of the optical image lens system. The third lens element has a concave object-side surface and a concave image-side surface, so that the negative refractive power of the optical image lens system can be enhanced for reducing the sensitivity thereof. The object-side surface and the image-side surface are aspheric. Furthermore, the image-side surface of the third lens element changes from concave at the paraxial region to convex, and then changes to concave again when away from the paraxial region. Therefore, the incident angle of the off-axis field on the image sensor can be effectively minimized and the aberration can be corrected as well.

The fourth lens element with positive refractive power complements the first lens element for reducing the sensitivity of the optical image lens system. The fourth lens element has a concave object-side surface and a convex image-side surface, so that the astigmatism of the optical image lens system can be corrected. The fourth lens element is made of plastic material, and the object-side surface and the image-side surface thereof are aspheric.

The fifth lens element with negative refractive power has a concave image-side surface, so that the principal point of the optical image lens system can be positioned away from the image plane, and the total track length of the optical image lens system can be reduced so as to maintain the compact size thereof. The fifth lens element is made of plastic material, and the object-side surface and the image-side surface thereof are aspheric. Furthermore, the fifth lens element has at least one inflection point formed on at least one surface thereof, so that the incident angle of the off-axis field on the image sensor can be effectively minimized and the aberration can be corrected as well.

When a curvature radius of the object-side surface of the third lens element is R5, and a curvature radius of the image-side surface of the third lens element is R6, the following relationship is satisfied: $0 < (R5+R6)/(R5-R6) < 5.0$. Therefore, the refractive power of the third lens element is proper by adjusting the curvatures of the object-side surface and the image-side surface thereof, and the sensitivity of the optical image lens system in manufacturing tolerance can be reduced. Preferably, R5 and R6 can satisfy the following relationship: $0 < (R5+R6)/(R5-R6) < 3.0$. Moreover, R5 and R6 can satisfy the following relationship: $0 < (R5+R6)/(R5-R6) < 1.0$.

When a central thickness of the second lens element is CT2, a central thickness of the third lens element is CT3, and an axial distance between the second lens element and the third lens element is T23, the following relationship is satisfied: $0.5 < (CT2+CT3)/T23 < 2.5$. Therefore, the thickness of the second lens element and the third lens element as well as the axial distance between the second lens element and the third lens element are proper, so that the fabrication of the lens elements can be easier, and the total track length of the optical image lens system can be reduced. Preferably, CT2, CT3 and T23 can satisfy the following relationship: $1.0 < (CT2+CT3)/T23 < 2.0$.

The optical image lens system further includes a stop, wherein an axial distance from the stop to the object-side surface of the first lens element is DS11, an axial distance from the stop to an image-side surface of the first lens element is DS12, and a central thickness of the first lens element is CT1, the following relationship is satisfied: $(|DS11|+|DAS12|)/CT1 < 1.1$. Therefore, the optical image lens system can have a good balance between the telecentric and wide-angle characteristics, as well as a desirable total track length of the optical image lens system.

When a curvature radius of the object-side surface of the second lens element is R3, and a curvature radius of the image-side surface of the second lens element is R4, the following relationship is satisfied: $-2.0 < (R3+R4)/(R3-R4) < -1.0$. Therefore, the aberration generated from the first lens element can be further corrected.

When a focal length of the optical image lens system is f, and a focal to length of the third lens element is f3, the following relationship is satisfied: $-0.8 < f/f3 < 0$. Therefore, the high order aberration of the optical image lens system can be corrected by the refractive power of the third lens element, and the sensitivity of the optical image lens system in manufacturing tolerance can be reduced. Preferably, f and f3 can satisfy the following relationship: $-0.6 < f/f3 < 0$.

When the focal length of the optical image lens system is f, and a diameter of an entrance pupil of the optical image lens system is EPD, the following relationship is satisfied: $2.2 < f/EPD < 3.4$. Therefore, the optical image lens system with the characteristic of a larger aperture can retain better image quality under insufficient lighting condition, and can obtain shallow depth of field for projecting the photography subject.

When a curvature radius of the object-side surface of the second lens element is R3, a curvature radius of the image-side surface of the second lens element is R4, the curvature radius of the object-side surface of the third lens element is R5, and the curvature radius of the image-side surface of the third lens element is R6, the following relationship is satisfied: −1.0<(R3×R6)/(R4×R5)<0. Therefore, the aberration and the sensitivity of the optical image lens system can be reduced.

When an Abbe number of the first lens element is V1, an Abbe number of the second lens element is V2, and an Abbe number of the third lens element is V3, the following relationship is satisfied: 0<V1−V2−V3<40. Therefore, the chromatic aberration of the optical image lens system can be corrected.

When the curvature radius of the image-side surface of the second lens element is R4, and the curvature radius of the image-side surface of the third to lens element is R6, the following relationship is satisfied: −1.7<R6/R4<0. Therefore, the aberration and the sensitivity of the optical image lens system can be reduced.

According to the optical image lens system of the present disclosure, the lens elements thereof can be made of glass or plastic material. When the lens elements are made of glass material, the distribution of the refractive power of the optical image lens system may be more flexible for design. When the lens elements are made of plastic material, the cost of manufacture can be effectively reduced. Furthermore, the surface of each lens element can be aspheric, so that it is easier to make the surface into non-spherical shapes. Consequently, more controllable variables are obtained, and the aberration as well as the number of required lens elements can be reduced while constructing an optical system. Therefore, the total track length of the optical image lens system can also be reduced.

According to the optical image lens system of the present disclosure, when the lens element has a convex surface, it indicates that the paraxial region of the surface is convex; and when the lens element has a concave surface, it indicates that the paraxial region of the surface is concave.

According to the optical image lens system of the present disclosure, the optical image lens system can include at least one stop, such as an aperture stop, glare stop, field stop, etc. Said glare stop or said field stop is allocated for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-8th specific embodiments are provided for further explanation.

1st Embodiment

Figure 2:
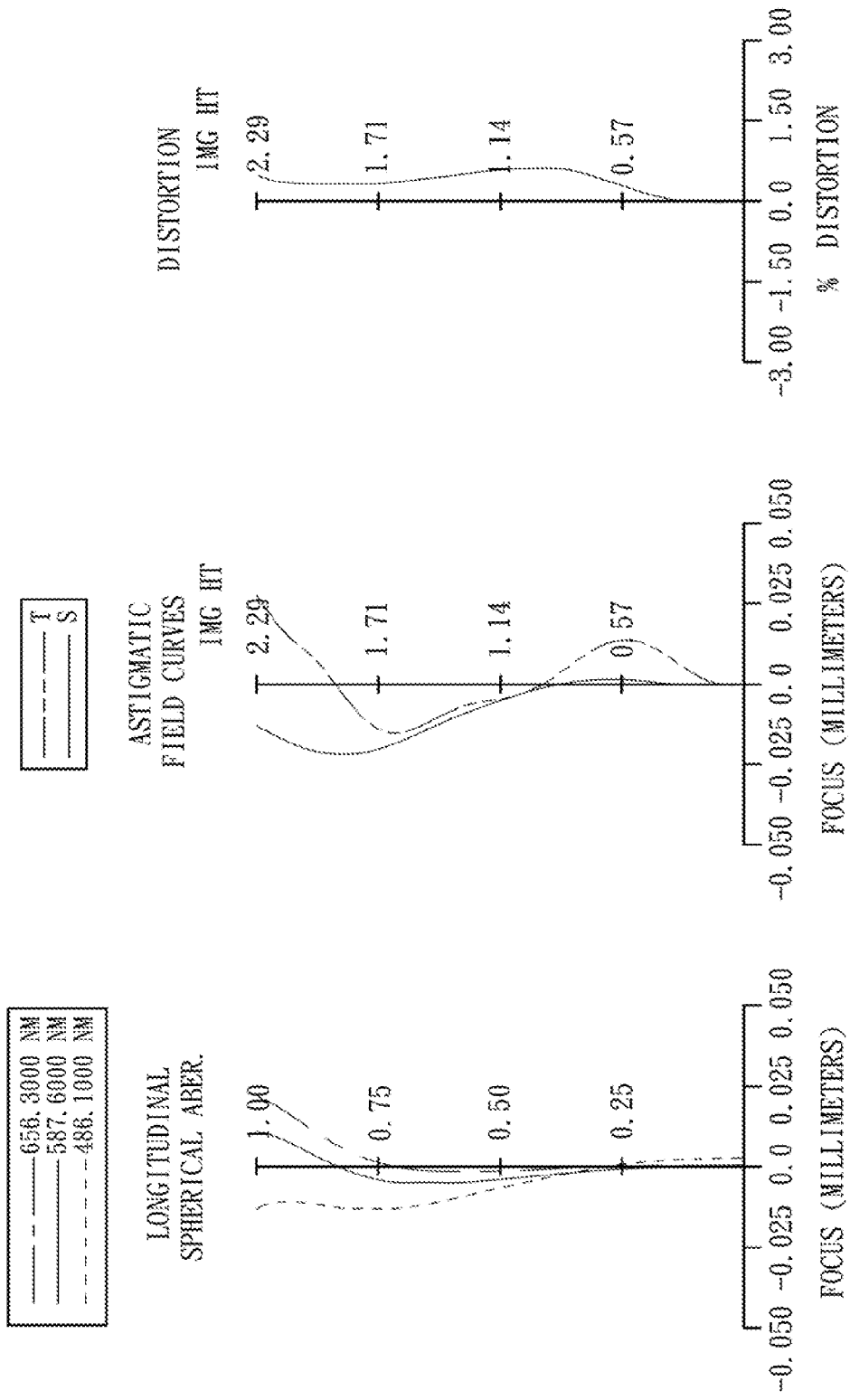
FIG. 2 shows spherical aberration curves, astigmatic field curves and a distortion curve of the optical image lens system according to the 1st embodiment.

FIG. 1 is a schematic view of an optical image lens system according to the 1st embodiment of the present disclosure. FIG. 2 shows spherical aberration curves, astigmatic field curves and a distortion curve of the optical image lens system according to the 1st embodiment, in FIG. 1, the optical image lens system includes, in order from an object side to an image side, the first lens element 110, an aperture stop 100, the second lens element 120, the third lens element 130, the fourth lens element 140, the fifth lens element 150, an IR-cut filter 170 and an image plane 160.

The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a concave object-side surface 121 and a convex image-side surface 122, and is made of plastic material. The object-side surface 121 and the image-side surface 122 of the second lens element 120 are aspheric.

The third lens element 130 with negative refractive power has a concave object-side surface 131 and a concave image-side surface 132, and is made of plastic material. The object-side surface 131 and the image-side surface 132 of the third lens element 130 are aspheric, and the third lens element 130 has inflection points formed on the image-side surface 132 thereof. Furthermore, FIG. 17 is a schematic view of surface shape changes of the third lens element 130 of the optical image lens system according to the 1st embodiment of the present disclosure. In FIG. 17, the image-side surface 132 of the third lens element 130 changes from concave (132a) at the paraxial region to convex (132b), and then changes to concave (132c) again when away from the paraxial region to the off-axis region thereof.

The fourth lens element 140 with positive refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a concave object-side surface 151 and a concave image-side surface 152, and is made of plastic material. The object-side surface 151 and the image-side surface 152 of the fifth lens element 150 are aspheric. Furthermore, the fifth lens element 150 has at least one inflection point formed on the object-side surface 151 and the image-side surface 152 thereof.

The IR-cut filter 170 is made of glass, and located between the fifth lens element 150 and the image plane 160, and will not affect the focal length of the optical image lens system.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i)$$

Wherein,

X is the distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the optical image lens system according to the 1st embodiment, when a focal length of the optical image lens system is f, an f-number of the optical image lens system is Fno, and half of the maximal field of view is HFOV, these parameters have the following values:

f=2.96 mm;

Fno=2.27; and

HFOV=37.6 degrees.

In the optical image lens system according to the 1st embodiment, when an Abbe number of the first lens element 110 is V1, an Abbe number of the second lens element 120 is V2, and the Abbe number of the third lens element 130 is V3, the following relationship is satisfied:

$V1-V2-V3=9.3$.

In the optical image lens system according to the 1st embodiment, when a central thickness of the first lens element 110 is CT1, a central thickness of the second lens element 120 is CT2, a central thickness of the third lens element 130 is CT3, and an axial distance between the second lens element 120 and the third lens element 130 is T23, the following relationship is satisfied:

$(CT2+CT3)/T23=1.72$.

In the optical image lens system according to the 1st embodiment, when an axial distance from the aperture stop 100 to the object-side surface 111 of the first lens element 110 is DS11, an axial distance from the aperture stop 100 to an image-side surface 112 of the first lens element 110 is DS12, and the central thickness of the first lens element 110 is CT1, the following relationship is satisfied:

$(|DS11|+|DS12|)/CT1=1.00$.

In the optical image lens system according to the 1st embodiment, when a curvature radius of the object-side surface 121 of the second lens element 120 is R3, a curvature radius of the image-side surface 122 of the second lens element 120 is R4, a curvature radius of the object-side surface 131 of the third lens element 130 is R5, and a curvature radius of the image-side surface 132 of the third lens element 130 is R6, the following relationships are satisfied:

$R6/R4=-0.04$;

$(R3+R4)/(R3-R4)=-1.06$;

$(R5+R6)/(R5-R6)=0.88$; and $(R3 \times R6)/(R4 \times R)=-0.002$.

In the optical image lens system according to the 1st embodiment, when the focal length of the optical image lens system is f, a focal length of the third lens element 130 is f3, and a diameter of an entrance pupil of the optical image lens system is EPD, the following relationships are satisfied:

$f/f3=-0.50$; and $f/EPD=2.27$.

The detailed optical data of the 1st embodiment are shown in Table 1 and the aspheric surface data are shown in Table 2 below.

TABLE 1

1st Embodiment
f = 2.96 mm, Fno = 2.27, HFOV = 37.6 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Lens 1 | 1.560530 (ASP) | 0.471 | Plastic | 1.544 | 55.9 | 2.04 |
| 2 |  | -3.427700 (ASP) | -0.031 |  |  |  |  |
| 3 | Ape. Stop | Plano | 0.081 |  |  |  |  |
| 4 | Lens 2 | -3.111200 (ASP) | 0.250 | Plastic | 1.640 | 23.3 | -5.02 |
| 5 |  | -100.000000 (ASP) | 0.291 |  |  |  |  |
| 6 | Lens 3 | -61.159200 (ASP) | 0.250 | Plastic | 1.640 | 23.3 | -5.87 |
| 7 |  | 4.007300 (ASP) | 0.224 |  |  |  |  |
| 8 | Lens 4 | -3.695600 (ASP) | 0.742 | Plastic | 1.544 | 55.9 | 1.23 |
| 9 |  | -0.608580 (ASP) | 0.154 |  |  |  |  |
| 10 | Lens 5 | -10.205300 (ASP) | 0.323 | Plastic | 1.544 | 55.9 | -1.25 |
| 11 |  | 0.739510 (ASP) | 0.500 |  |  |  |  |
| 12 | IR-cut filter | Plano | 0.200 | Glass | 1.517 | 64.2 | — |
| 13 |  | Plano | 0.437 |  |  |  |  |
| 14 | Image | Plano | — |  |  |  |  |

Note:
Reference wavelength (d-line) is 587.6 nm.

TABLE 2

Aspheric Coefficients

| Surface # | 1 | 2 | 4 | 5 | 6 |
|---|---|---|---|---|---|
| k = | -9.63234E+00 | -4.76980E+01 | -4.05915E+01 | -5.00000E+01 | -4.43769E-12 |
| A4 = | 2.79299E-01 | 8.63586E-02 | 2.54635E-01 | 2.20905E-02 | -7.02298E-01 |
| A6 = | -5.95445E-01 | -2.19568E-01 | -5.79541E-01 | -5.85110E-01 | 5.36732E-01 |
| A8 = | 9.11045E-01 | -3.95270E-01 | 1.33309E+00 | 1.58396E+00 | -4.65739E+00 |
| A10 = | -1.16479E+00 | 1.59673E+00 | -3.13760E+00 | -3.59516E+00 | 1.18501E+01 |
| A12 = | 2.99142E-01 | -2.49120E+00 | 5.14231E+00 | 2.92942E+00 | -9.85909E+00 |
| A14 = | 1.89624E-01 | 1.41639E+00 | -4.51671E+00 | -1.14527E+00 |  |

| Surface # | 7 | 8 | 9 | 10 | 11 |
|---|---|---|---|---|---|
| k = | -4.32669E+01 | -4.74683E+01 | -3.31359E+00 | -3.24994E+00 | -6.77042E+00 |
| A4 = | -4.12376E-01 | -2.46751E-01 | -4.02688E-01 | -2.43210E-01 | -2.19011E-01 |
| A6 = | 7.76021E-01 | 6.96294E-01 | 5.38050E-01 | 1.68956E-01 | 1.64993E-01 |
| A8 = | -3.28316E+00 | -1.39507E+00 | -5.44598E-01 | -2.21447E-02 | -9.11143E-02 |
| A10 = | 7.97495E+00 | 1.41371E+00 | 4.27840E-01 | -4.04438E-02 | 3.12686E-02 |

TABLE 2-continued

Aspheric Coefficients

| A12 = | −9.88916E+00 | −4.37903E−01 | −1.30749E−01 | 2.36383E−02 | −6.17947E−03 |
|---|---|---|---|---|---|
| A14 = | 6.70890E+00 | −1.12801E−01 | | −3.82162E−03 | 5.28438E−04 |
| A16 = | −2.04553E+00 | | | | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
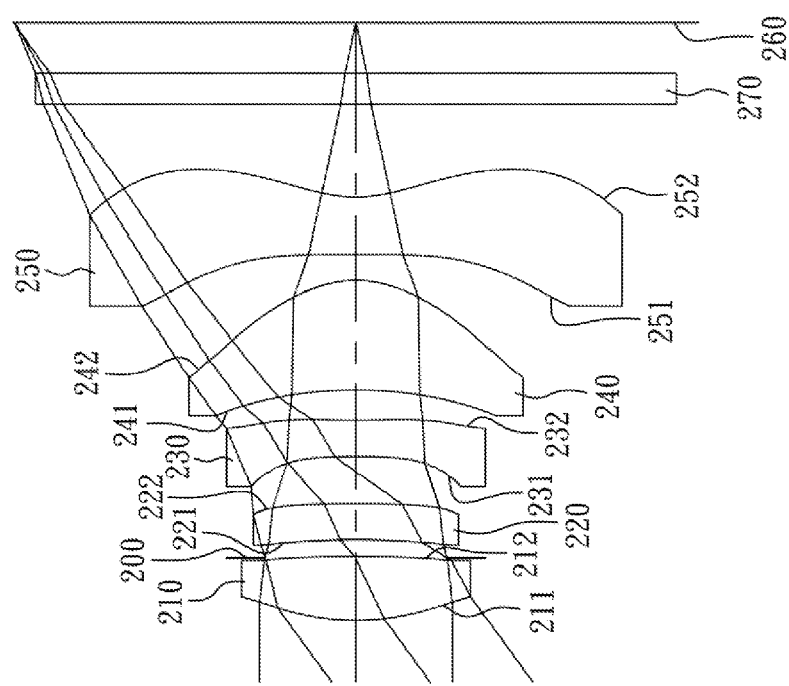
FIG. 3 is a schematic view of an optical image lens system according to the 2nd embodiment of the present disclosure.
Figure 4:
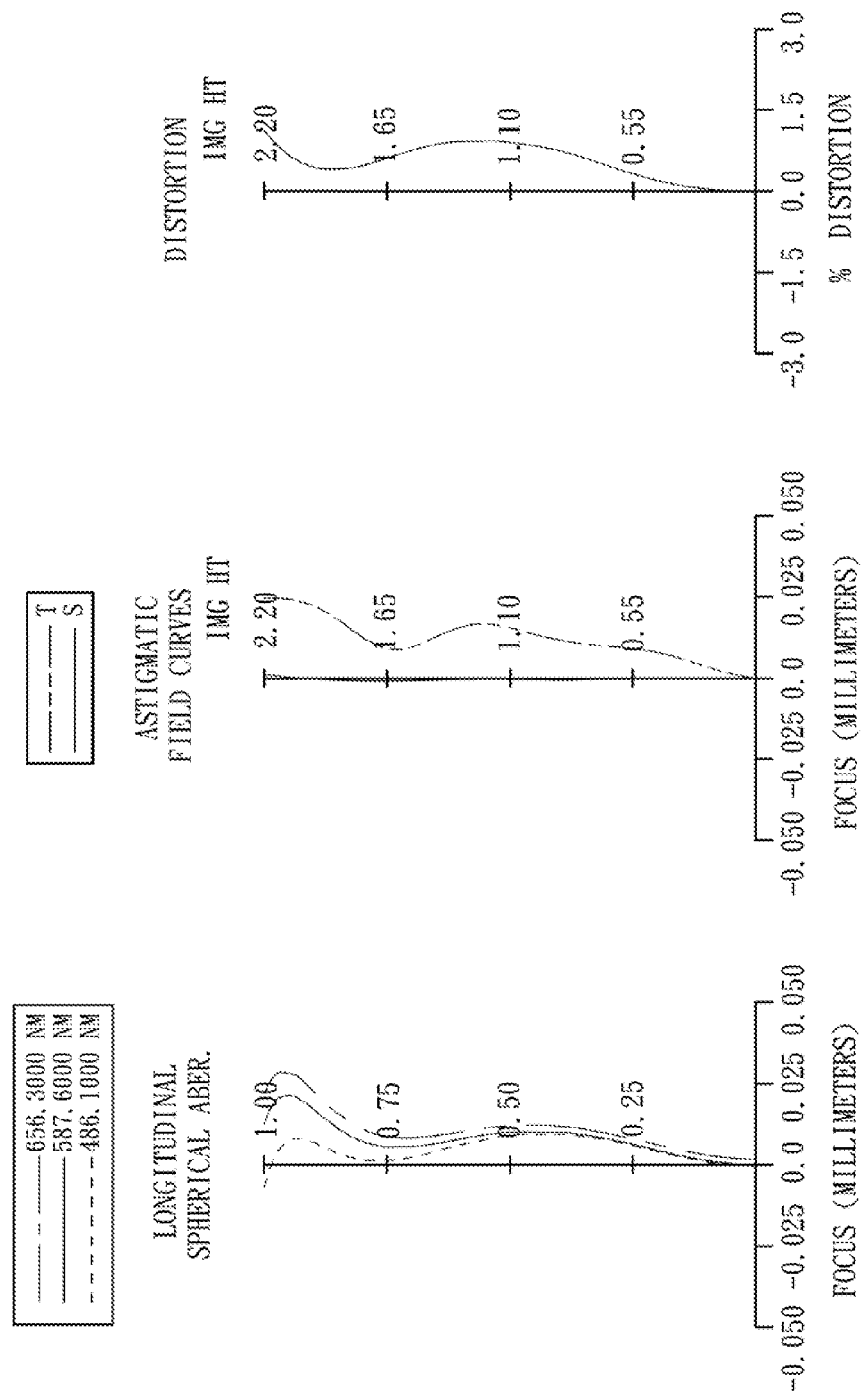
FIG. 4 shows spherical aberration curves, astigmatic field curves and a distortion curve of the optical image lens system according to the 2nd embodiment.

FIG. 3 is a schematic view of an optical image lens system according to the 2nd embodiment of the present disclosure. FIG. 4 shows spherical aberration curves, astigmatic field curves and a distortion curve of the optical image lens system according to the 2nd embodiment. In FIG. 3, the optical image lens system includes, in order from an object side to an image side, the first lens element 210, an aperture stop 200, the second lens element 220, the third lens element 230, the fourth lens element 240, the fifth lens element 250, an IR-cut filter 270 and an image plane 260.

The first lens element 210 with positive refractive power has a convex object-side surface 211 and a convex image-side surface 212, and is made of glass. The object-side surface 211 and the image-side surface 212 of the first lens element 210 are aspheric.

The second lens element 220 with negative refractive power has a concave object-side surface 221 and a convex image-side surface 222, and is made of plastic material. The object-side surface 221 and the image-side surface 222 of the second lens element 220 are aspheric.

The third lens element 230 with negative refractive power has a concave object-side surface 231 and a concave image-side surface 232, and is made of plastic material. The object-side surface 231 and the image-side surface 232 of the third lens element 230 are aspheric, and the third lens element 230 has inflection points formed on the image-side surface 232 thereof. Furthermore, the image-side surface 232 of the third lens element 230 changes from concave at the paraxial region to convex, and concave again when away from the paraxial region to the off-axis region thereof. (Please refer to FIG. 17.)

The fourth lens element 240 with positive refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a convex object-side surface 251 and a concave image-side surface 252, and is made of plastic material. The object-side surface 251 and the image-side surface 252 of the fifth lens element 250 are aspheric. Furthermore, the fifth lens element 250 has at least one inflection point formed on the object-side surface 251 and the image-side surface 252 thereof.

The IR-cut filter 270 is made of glass, and located between the fifth lens element 250 and the image plane 260, and will not affect the focal length of the optical image lens system.

The detailed optical data of the 2nd embodiment are shown in Table 3 and the aspheric surface data are shown in Table 4 below.

TABLE 3

2nd Embodiment
f = 2.98 mm, Fno = 2.40, HFOV = 36.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.526310 | (ASP) | 0.415 | Glass | 1.569 | 71.3 | 2.40 |
| 2 | | −11.500800 | (ASP) | −0.007 | | | | |
| 3 | Ape. Stop | Plano | | 0.115 | | | | |
| 4 | Lens 2 | −4.647900 | (ASP) | 0.230 | Plastic | 1.640 | 23.3 | −12.88 |
| 5 | | −10.865200 | (ASP) | 0.308 | | | | |
| 6 | Lens 3 | −7.059400 | (ASP) | 0.232 | Plastic | 1.640 | 23.3 | −5.28 |
| 7 | | 6.561700 | (ASP) | 0.196 | | | | |
| 8 | Lens 4 | −2.652500 | (ASP) | 0.709 | Plastic | 1.544 | 55.9 | 1.47 |
| 9 | | −0.672900 | (ASP) | 0.167 | | | | |
| 10 | Lens 5 | 28.985500 | (ASP) | 0.370 | Plastic | 1.544 | 55.9 | −1.55 |
| 11 | | 0.813390 | (ASP) | 0.600 | | | | |
| 12 | IR-cut filter | Plano | | 0.200 | Glass | 1.517 | 64.2 | — |
| 13 | | Plano | | 0.326 | | | | |
| 14 | Image | Plano | | — | | | | |

Note:
Reference wavelength (d-line) is 587.6 nm.

TABLE 4

Aspheric Coefficients

| Surface # | 1 | 2 | 4 | 5 | 6 |
|---|---|---|---|---|---|
| k = | −1.04320E+01 | 1.16117E−15 | −3.43536E−17 | 0.00000E+00 | −1.11890E−16 |
| A4 = | 3.15386E−01 | −4.67422E−02 | 8.75822E−02 | −6.45242E−02 | −7.69888E−01 |
| A6 = | −6.63323E−01 | −5.82860E−03 | −1.78534E−01 | −4.39164E−01 | 6.62652E−01 |
| A8 = | 9.30139E−01 | −4.07333E−01 | 9.52442E−01 | 1.28736E+00 | −4.62168E+00 |
| A10 = | −1.12399E+00 | 1.40894E+00 | −3.67121E+00 | −4.01661E+00 | 1.12927E+01 |
| A12 = | 2.99139E−01 | −2.49120E+00 | 5.14231E+00 | 2.92942E+00 | −9.85909E+00 |
| A14 = | 1.89625E−01 | 1.41639E+00 | −4.51671E+00 | −1.14527E+00 | |

| Surface # | 7 | 8 | 9 | 10 | 11 |
|---|---|---|---|---|---|
| k = | −3.00000E+01 | −3.00000E+01 | −3.35559E+00 | 0.00000E+00 | −6.47886E+00 |
| A4 = | −4.87539E−01 | −2.29811E−01 | −3.75257E−01 | −2.73248E−01 | −2.13700E−01 |
| A6 = | 9.30713E−01 | 5.64587E−01 | 4.86086E−01 | 1.52933E−01 | 1.53245E−01 |
| A8 = | −3.28320E+00 | −1.22642E+00 | −5.48381E−01 | −2.07499E−02 | −8.78075E−02 |
| A10 = | 7.95100E+00 | 1.39849E+00 | 4.28415E−01 | −3.71683E−02 | 3.07795E−02 |
| A12 = | −9.88916E+00 | −5.29424E−01 | −1.29982E−01 | 2.44296E−02 | −6.22466E−03 |
| A14 = | 6.70890E+00 | −1.12800E−01 | | −4.34176E−03 | 5.58550E−04 |
| A16 = | −2.04553E+00 | | | | |

In the optical image lens system according to the 2nd embodiment, the definitions of f, Fno, HFOV, V1, V2, V3, CT1, CT2, CT3, T23, DS11, DS12, R3, R4, R5, R6, f3 and EPD are the same as those stated in the first embodiment with corresponding values for the 2nd embodiment. Moreover, these parameters can be calculated from Table 3 and Table 4 as the following values and satisfy the following relationships:

| | |
|---|---|
| f (mm) | 2.98 |
| Fno | 2.40 |
| HFOV (deg.) | 36.0 |
| V1 − V2 − V3 | 24.7 |
| (CT2 + CT3)/T23 | 1.50 |
| (|DS11| + |DS12|)/CT1 | 1.00 |
| R6/R4 | −0.60 |
| (R3 + R4)/(R3 − R4) | −2.50 |
| (R5 + R6)/(R5 − R6) | 0.04 |
| (R3*R6)/(R4*R5) | −0.398 |
| f/f3 | −0.57 |
| f/EPD | 2.40 |

3rd Embodiment

Figure 5:
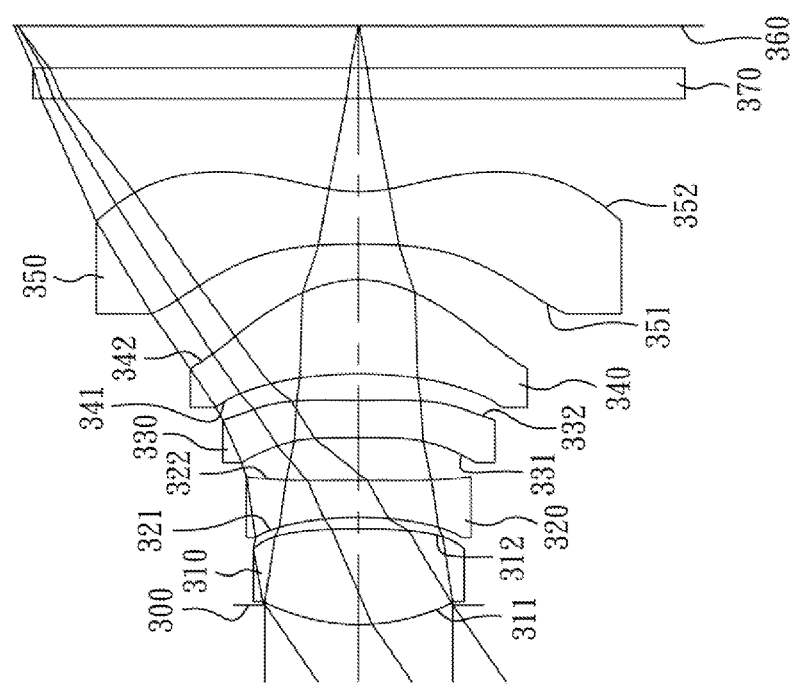
FIG. 5 is a schematic view of an optical image lens system according to the 3rd embodiment of the present disclosure.
Figure 6:
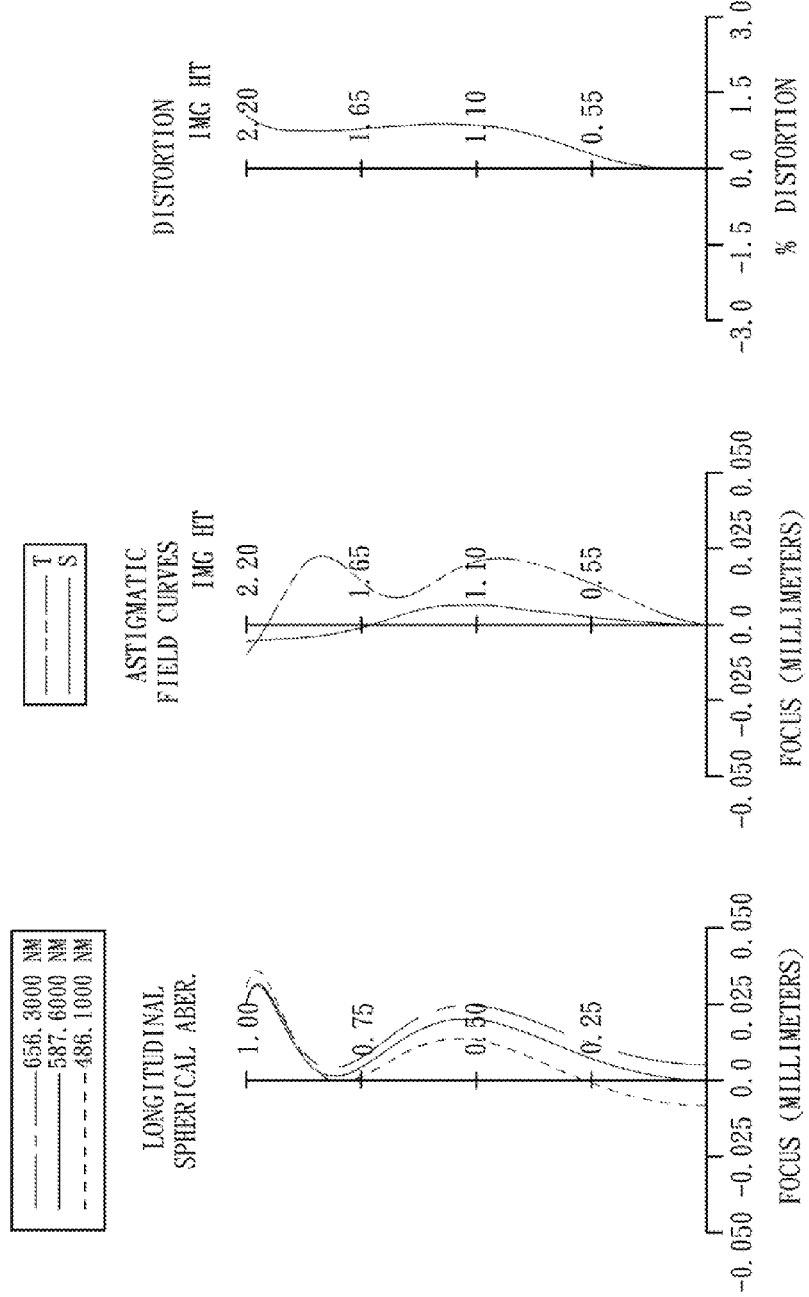
FIG. 6 shows spherical aberration curves, astigmatic field curves and a distortion curve of the optical image lens system according to the 3rd embodiment.

FIG. 5 is a schematic view of an optical image lens system according to the 3rd embodiment of the present disclosure. FIG. 6 shows spherical aberration curves, astigmatic field curves and a distortion curve of the optical image lens system according to the 3rd embodiment. In FIG. 5, the optical image lens system includes, in order from an object side to an image side, an aperture stop 300, the first lens element 310, the second lens element 320, the third lens element 330, the fourth lens element 340, the fifth lens element 350, an IR-cut filter 370 and an image plane 360.

The first lens element 310 with positive refractive power has a convex object-side surface 311 and a convex image-side surface 312, and is made of plastic material. The object-side surface 311 and the image-side surface 312 of the first lens element 310 are aspheric.

The second lens element 320 with negative refractive power has a concave object-side surface 321 and a convex image-side surface 322, and is made of plastic material. The object-side surface 321 and the image-side surface 322 of the second lens element 320 are aspheric.

The third lens element 330 with negative refractive power has a concave object-side surface 331 and a concave image-side surface 332, and is made of plastic material. The object-side surface 331 and the image-side surface 332 of the third lens element 330 are aspheric, and the third lens element 330 has inflection points formed on the image-side surface 332 thereof. Furthermore, the image-side surface 332 of the third lens element 330 changes from concave to convex, and then changes to concave when away from the paraxial region to the off-axis region thereof. (Please refer to FIG. 17.)

The fourth lens element 340 with positive refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a concave object-side surface 351 and a concave image-side surface 352, and is made of plastic material. The object-side surface 351 and the image-side surface 352 of the fifth lens element 350 are aspheric. Furthermore, the fifth lens element 350 has at least one inflection point formed on the object-side surface 351 and the image-side surface 352 thereof.

The IR-cut filter 370 is made of glass, and located between the fifth lens element 350 and the image plane 360, and will not affect the focal length of the optical image lens system.

The detailed optical data of the 3rd embodiment are shown in Table 5 and the aspheric surface data are shown in Table 6 below.

TABLE 5

3rd Embodiment
f = 3.15 mm, Fno = 2.60, HFOV = 34.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.128 | | | | |
| 2 | Lens 1 | 1.315540 | (ASP) | 0.618 | Plastic | 1.544 | 55.9 | 1.98 |
| 3 | | −4.989500 | (ASP) | 0.074 | | | | |
| 4 | Lens 2 | −2.192860 | (ASP) | 0.240 | Plastic | 1.634 | 23.8 | −3.76 |
| 5 | | −28.968700 | (ASP) | 0.275 | | | | |
| 6 | Lens 3 | −38.651300 | (ASP) | 0.240 | Plastic | 1.544 | 55.9 | −14.00 |
| 7 | | 9.511600 | (ASP) | 0.175 | | | | |
| 8 | Lens 4 | −2.479020 | (ASP) | 0.606 | Plastic | 1.544 | 55.9 | 1.65 |
| 9 | | −0.714690 | (ASP) | 0.232 | | | | |
| 10 | Lens 5 | −5.785800 | (ASP) | 0.336 | Plastic | 1.535 | 56.3 | −1.52 |
| 11 | | 0.964630 | (ASP) | 0.600 | | | | |
| 12 | IR-cut filter | Plano | | 0.200 | Glass | 1.517 | 64.2 | — |
| 13 | | Plano | | 0.271 | | | | |
| 14 | Image | Plano | | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | −6.72116E+00 | −1.02735E+01 | −9.51866E−02 | −3.00000E+01 | −3.00000E+01 |
| A4 = | 3.68309E−01 | −1.26731E−01 | 3.51701E−02 | 8.05284E−02 | −7.23433E−01 |
| A6 = | −6.68373E−01 | −4.50779E−01 | −2.76237E−01 | −1.62356E−01 | 8.59405E−01 |
| A8 = | 1.50809E+00 | 1.08002E+00 | 7.93218E−01 | 1.84350E+00 | −4.31607E+00 |
| A10 = | −2.30038E+00 | 1.93782E−01 | −3.70930E+00 | −3.82014E+00 | 1.19221E+01 |
| A12 = | 2.99135E−01 | −2.49120E+00 | 5.14231E+00 | 2.91540E+00 | −9.84355E+00 |
| A14 = | 1.89622E−01 | 1.41639E+00 | −4.51671E+00 | −1.14527E+00 | |

| Surface # | 7 | 8 | 9 | 10 | 11 |
|---|---|---|---|---|---|
| k = | −8.19502E−15 | −2.99831E+01 | −3.51335E+00 | 0.00000E+00 | −8.42989E+00 |
| A4 = | −5.18593E−01 | −2.41614E−01 | −3.68127E−01 | −2.93435E−01 | −2.28421E−01 |
| A6 = | 8.39201E−01 | 5.27011E−01 | 5.09791E−01 | 1.54769E−01 | 1.56598E−01 |
| A8 = | −3.35219E+00 | −1.22690E+00 | −5.45468E−01 | −1.25880E−02 | −8.50562E−02 |
| A10 = | 8.02243E+00 | 1.38975E+00 | 4.19705E−01 | −3.29950E−02 | 2.99631E−02 |
| A12 = | −9.83490E+00 | −5.25859E−01 | −1.26271E−01 | 2.43339E−02 | −6.35918E−03 |
| A14 = | 6.65004E+00 | −1.28118E−01 | | −5.22732E−03 | 6.05260E−04 |
| A16 = | −2.04648E+00 | | | | |

In the optical image lens system according to the 3rd embodiment, the definitions of f, Fno, HFOV, V1, V2, V3, CT1, CT2, CT3, T23, DS11, DS12, R3, R4, R5, R6, f3 and EPD are the same as those stated in the first embodiment with corresponding values for the 3rd embodiment. Moreover, these parameters can be calculated from Table 5 and Table 6 as the following values and satisfy the following relationships:

| | |
|---|---|
| f (mm) | 3.15 |
| Fno | 2.60 |
| HFOV (deg.) | 34.5 |
| V1 − V2 − V3 | −23.8 |
| (CT2 + CT3)/T23 | 1.75 |
| (|DS11| + |DS12|)/CT1 | 1.00 |
| R6/R4 | −0.33 |
| (R3 + R4)/(R3 − R4) | −1.16 |
| (R5 + R6)/(R5 − R6) | 0.61 |
| (R3*R6)/(R4*R5) | −0.019 |
| f/f3 | −0.23 |
| f/EPD | 2.60 |

4th Embodiment

Figure 7:
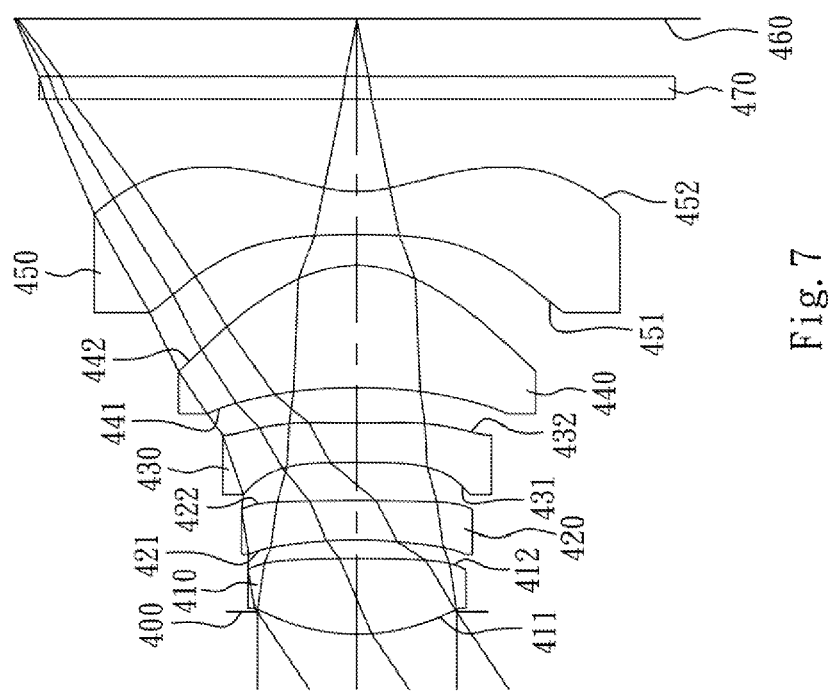
FIG. 7 is a schematic view of an optical image lens system according to the 4th embodiment of the present disclosure.
Figure 8:
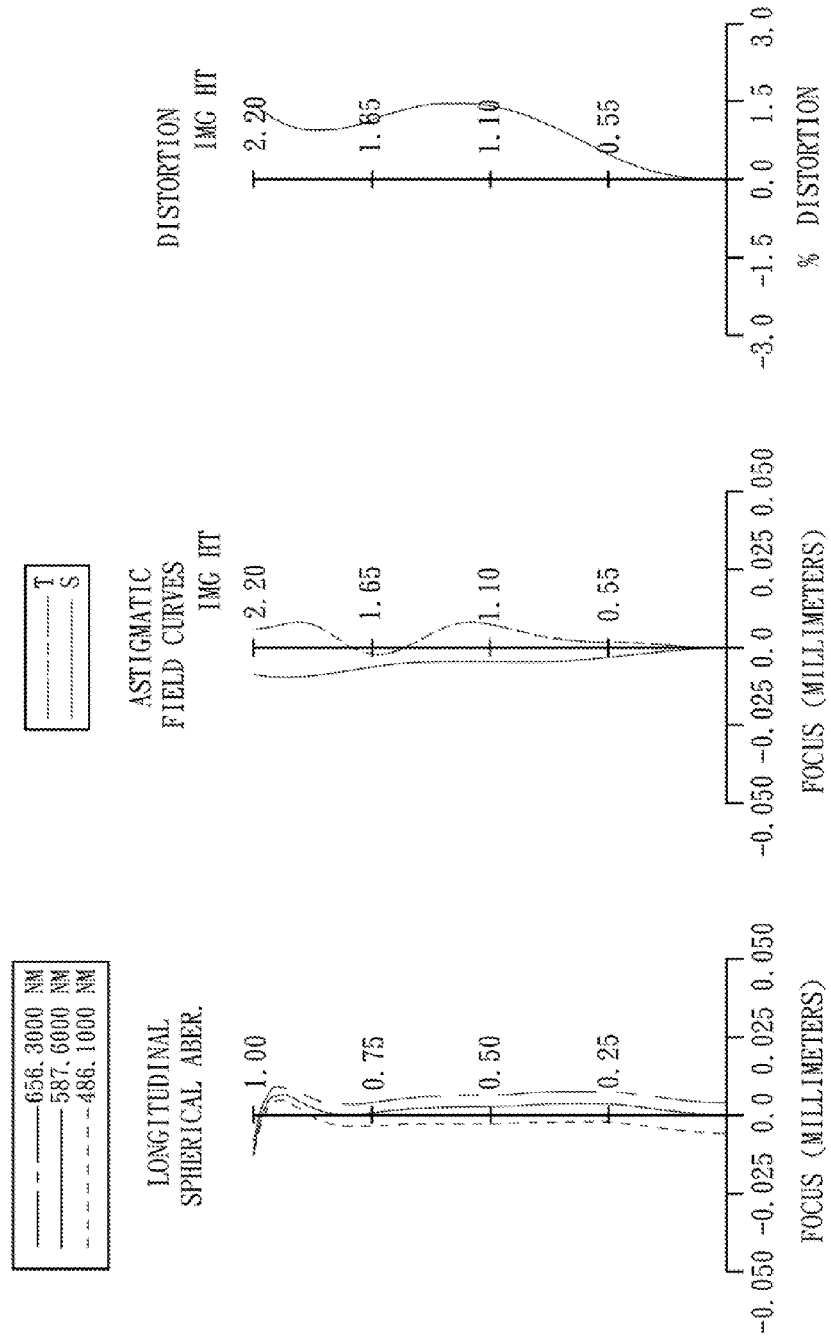
FIG. 8 shows spherical aberration curves, astigmatic field curves and a distortion curve of the optical image lens system according to the 4th embodiment.

FIG. 7 is a schematic view of an optical image lens system according to the 4th embodiment of the present disclosure. FIG. 8 shows spherical aberration curves, astigmatic field curves and a distortion curve of the optical image lens system according to the 4th embodiment. In FIG. 7, the optical image lens system includes, in order from an object side to an image side, an aperture stop 400, the first lens element 410, the second lens element 420, the third lens element 430, the fourth lens element 440, the fifth lens element 450, an IR-cut filter 470 and an image plane 460.

The first lens element 410 with positive refractive power has a convex object-side surface 411 and a convex image-side surface 412, and is made of plastic material. The object-side surface 411 and the image-side surface 412 of the first lens element 410 are aspheric.

The second lens element 420 with negative refractive power has a concave object-side surface 421 and a convex image-side surface 422, is made of plastic material. The object-side surface 421 and the image-side surface 422 of the second lens element 420 are aspheric.

The third lens element 430 with negative refractive power has a concave object-side surface 431 and a concave image-side surface 432, and is made of plastic material. The object-side surface 431 and the image-side surface 432 of the third lens element 430 are aspheric, and the third lens element 430 has inflection points formed on the image-side surface 432 thereof. Furthermore, the image-side surface 432 of the third lens element 430 changes from concave to convex, and then changes to concave when away from the paraxial region to the off-axis region thereof. (Please refer to FIG. 17.)

The fourth lens element 440 with positive refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a concave object-side surface 451 and a concave image-side surface 452, and is made of plastic material. The object-side surface 451 and the image-side surface 452 of the fifth lens element 450 are aspheric. Furthermore, the fifth lens element 450 has at least one inflection point formed on the object-side surface 451 and the image-side surface 452 thereof.

The IR-cut filter 470 is made of glass, and located between the fifth lens element 450 and the image plane 460, and will not affect the focal length of the optical image lens system.

The detailed optical data of the 4th embodiment are shown in Table 7 and the aspheric surface data are shown in Table 8 below.

TABLE 7

4th Embodiment
f = 3.22 mm, Fno = 2.50, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.143 | | | | |
| 2 | Lens 1 | 1.311250 (ASP) | 0.492 | Plastic | 1.535 | 56.3 | 2.19 |
| 3 | | −9.685100 (ASP) | 0.120 | | | | |
| 4 | Lens 2 | −2.744420 (ASP) | 0.250 | Plastic | 1.634 | 23.8 | −5.11 |
| 5 | | −18.558700 (ASP) | 0.249 | | | | |
| 6 | Lens 3 | −38.643500 (ASP) | 0.250 | Plastic | 1.634 | 23.8 | −9.75 |
| 7 | | 7.379500 (ASP) | 0.231 | | | | |
| 8 | Lens 4 | −3.696000 (ASP) | 0.794 | Plastic | 1.544 | 55.9 | 1.45 |
| 9 | | −0.698300 (ASP) | 0.197 | | | | |
| 10 | Lens 5 | −7.254700 (ASP) | 0.275 | Plastic | 1.535 | 56.3 | −1.39 |
| 11 | | 0.840750 (ASP) | 0.600 | | | | |
| 12 | IR-cut filter | Plano | 0.145 | Glass | 1.517 | 64.2 | — |
| 13 | | Plano | 0.374 | | | | |
| 14 | Image | Plano | — | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | −9.11618E+00 | 1.00000E+00 | −1.47997E+01 | −2.00000E+01 | −2.00000E+01 |
| A4 = | 4.85865E−01 | −4.46471E−03 | 8.77605E−02 | 3.34938E−02 | −6.93061E−01 |
| A6 = | −8.88249E−01 | −1.80016E−01 | −2.88835E−01 | −1.89409E−01 | 4.94929E−01 |
| A8 = | 1.29047E+00 | −2.04799E−01 | 7.07062E−01 | 3.78265E−01 | −2.34458E+00 |
| A10 = | −7.86516E−01 | 9.62485E−02 | −3.41754E+00 | −1.94826E+00 | 3.96454E+00 |
| A12 = | −1.09451E+00 | −1.78134E+00 | 5.78208E+00 | 3.11793E+00 | −2.65280E+00 |
| A14 = | 1.89615E−01 | 1.41639E+00 | −4.51671E+00 | −2.86152E+00 | |

| Surface # | 7 | 8 | 9 | 10 | 11 |
|---|---|---|---|---|---|
| k = | −1.00000E+00 | −9.41016E+00 | −3.67690E+00 | 0.00000E+00 | −7.08589E+00 |
| A4 = | −5.50908E−01 | −1.70310E−01 | −3.27603E−01 | −2.64346E−01 | −2.25800E−01 |
| A6 = | 1.09741E+00 | 4.67436E−01 | 4.28940E−01 | 1.18428E−01 | 1.55789E−01 |
| A8 = | −3.45513E+00 | −1.06054E+00 | −4.79851E−01 | −1.78698E−02 | −8.75765E−02 |
| A10 = | 7.76097E+00 | 1.44136E+00 | 3.30467E−01 | −3.07968E−02 | 3.04151E−02 |
| A12 = | −9.78982E+00 | −9.85182E−01 | −9.07311E−02 | 2.57299E−02 | −5.97045E−03 |
| A14 = | 6.83290E+00 | 2.37541E−01 | | −5.31402E−03 | 5.15343E−04 |
| A16 = | −1.94473E+00 | | | | |

In the optical image lens system according to the 4th embodiment, the definitions of f, Fno, HFOV, V1, V2, V3, CT1, CT2, CT3, T23, DS11, DS12, R3, R4, R5, R6, f3 and EPD are the same as those stated in the first embodiment with corresponding values for the 4th embodiment. Moreover, these parameters can be calculated from Table 7 and Table 8 as the following values and satisfy the following relationships:

| | |
|---|---|
| f (mm) | 3.22 |
| Fno | 2.50 |
| HFOV (deg.) | 34.0 |
| V1 − V2 − V3 | 8.7 |
| (CT2 + CT3)/T23 | 2.01 |
| (|DS11| + |DS12|)/CT1 | 1.00 |
| R6/R4 | −0.40 |
| (R3 + R4)/(R3 − R4) | −1.35 |
| (R5 + R6)/(R5 − R6) | 0.68 |
| (R3*R6)/(R4*R5) | −0.028 |
| f/f3 | −0.33 |
| f/EPD | 2.50 |

5th Embodiment

Figure 9:
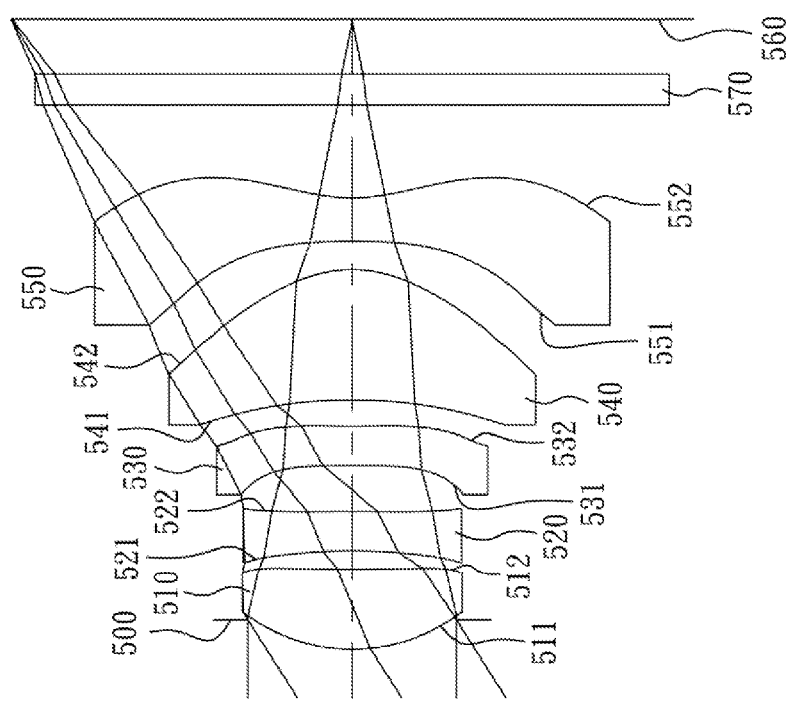
FIG. 9 is a schematic view of an optical image lens system according to the 5th embodiment of the present disclosure.
Figure 10:
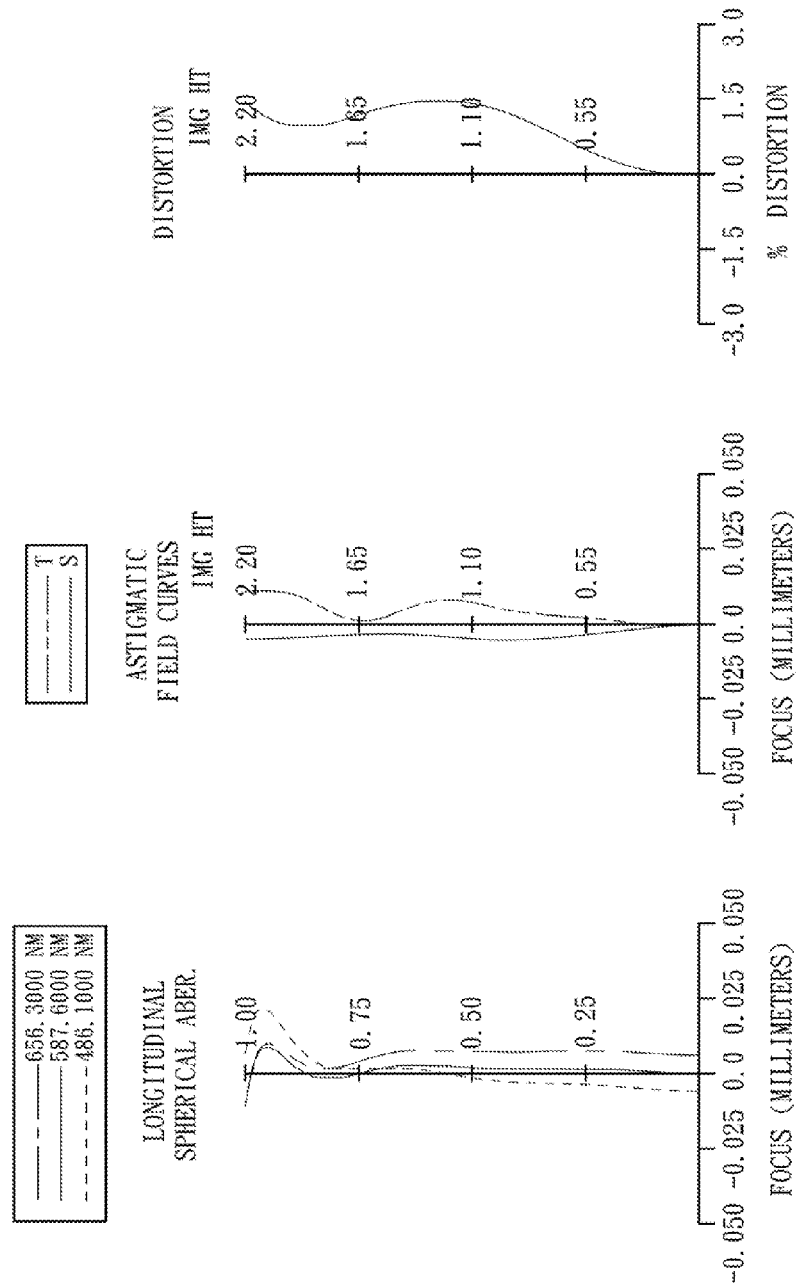
FIG. 10 shows spherical aberration curves, astigmatic field curves and a distortion curve of the optical image lens system according to the 5th embodiment.

FIG. 9 is a schematic view of an optical image lens system according to the 5th embodiment of the present disclosure. FIG. 10 shows spherical aberration curves, astigmatic field curves and a distortion curve of the optical image lens system according to the 5th embodiment. In FIG. 9, the optical image lens system includes, in order from an object side to an image side, an aperture stop 500, the first lens element 510, the second lens element 520, the third lens element 530, the fourth lens element 540, the fifth lens element 550, an IR-cut filter 570 and an image plane 560.

The first lens element 510 with positive refractive power has a convex object-side surface 511 and a concave image-side surface 512, and is made of plastic material. The object-side surface 511 and the image-side surface 512 of the first lens element 510 are aspheric.

The second lens element 520 with negative refractive power has a concave object-side surface 521 and a convex image-side surface 522, and is made of plastic material. The object-side surface 521 and the image-side surface 522 of the second lens element 520 are aspheric.

The third lens element 530 with negative refractive power has a concave object-side surface 531 and a concave image-side surface 532, and is made of plastic material. The object-side surface 531 and the image-side surface 532 of the third lens element 530 are aspheric, and the third lens element 530 has inflection points formed on the image-side surface 532 thereof. Furthermore, the image-side surface 532 of the third lens element 530 changes from concave to convex, and then changes to concave when away from the paraxial region to the off-axis region thereof. (Please refer to FIG. 17.)

The fourth lens element 540 with positive refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a concave object-side surface 551 and a concave image-side surface 552, and is made of plastic material. The object-side surface 551 and the image-side surface 552 of the fifth lens element 550 are aspheric. Furthermore, the fifth lens element 550 has at least one inflection point formed on the object-side surface 551 and the image-side surface 552 thereof.

The IR-cut filter 570 is made of glass, and located between the fifth lens element 550 and the image plane 560, and will not affect the focal length of the optical image lens system.

The detailed optical data of the 5th embodiment are shown in Table 9 and the aspheric surface data are shown in Table 10 below.

TABLE 9

5th Embodiment
f = 3.42 mm, Fno = 2.54, HFOV = 32.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.189 | | | | |
| 2 | Lens 1 | 1.161970 | (ASP) | 0.518 | Plastic | 1.544 | 55.9 | 2.33 |
| 3 | | 11.961700 | (ASP) | 0.121 | | | | |
| 4 | Lens 2 | −3.492900 | (ASP) | 0.250 | Plastic | 1.650 | 21.4 | −5.70 |
| 5 | | −62.893100 | (ASP) | 0.300 | | | | |
| 6 | Lens 3 | −35.919500 | (ASP) | 0.250 | Plastic | 1.607 | 26.6 | −10.25 |
| 7 | | 7.550600 | (ASP) | 0.170 | | | | |
| 8 | Lens 4 | −4.152500 | (ASP) | 0.844 | Plastic | 1.544 | 55.9 | 1.58 |
| 9 | | −0.761370 | (ASP) | 0.185 | | | | |
| 10 | Lens 5 | −4.807200 | (ASP) | 0.275 | Plastic | 1.530 | 55.8 | −1.52 |
| 11 | | 0.985980 | (ASP) | 0.600 | | | | |
| 12 | IR-cut filter | Plano | | 0.200 | Glass | 1.517 | 64.2 | — |
| 13 | | Plano | | 0.356 | | | | |
| 14 | Image | Plano | | — | | | | |

Note:
Reference wavelength (d-line) is 587.6 nm

TABLE 10

Aspheric Coefficients

| Surface # | 2 | 3 | 4 | 5 | 6 |
|---|---|---|---|---|---|
| k = | −5.96593E+00 | 5.28409E−01 | 1.00000E+00 | −1.00000E+00 | −1.07438E+01 |
| A4 = | 4.79640E−01 | −6.94065E−02 | −4.65316E−03 | 1.51651E−02 | −6.53438E−01 |

TABLE 10-continued

| Aspheric Coefficients | | | | | |
|---|---|---|---|---|---|
| A6 = | −5.57487E−01 | 7.43731E−02 | 1.98356E−01 | 3.53877E−01 | 5.41681E−01 |
| A8 = | 5.79544E−01 | −6.67971E−01 | −1.21979E−01 | −7.91143E−01 | −1.83619E+00 |
| A10 = | 5.42462E−01 | 1.54704E+00 | −2.14237E+00 | 1.49831E+00 | 1.53323E+00 |
| A12 = | −1.96152E+00 | −3.51220E+00 | 5.09299E+00 | −2.69125E+00 | −6.46067E−01 |
| A14 = | 8.48315E−01 | 1.37165E+00 | −5.13076E+00 | 2.57513E+00 | |

| Surface # | 7 | 8 | 9 | 10 | 11 |
|---|---|---|---|---|---|
| k = | −1.00000E+00 | 6.64001E−01 | −3.90091E+00 | 0.00000E+00 | −8.51691E+00 |
| A4 = | −6.23049E−01 | −2.16103E−01 | −2.91573E−01 | −2.47533E−01 | −2.14656E−01 |
| A6 = | 1.25000E+00 | 5.85430E−01 | 3.59912E−01 | 1.08504E−01 | 1.43688E−01 |
| A8 = | −3.62934E+00 | −1.15940E+00 | −3.83319E−01 | −2.39805E−02 | −8.20848E−02 |
| A10 = | 7.33179E+00 | 1.47629E+00 | 2.65151E−01 | −2.78605E−02 | 2.96050E−02 |
| A12 = | −9.43956E+00 | −9.73173E−01 | −7.53348E−02 | 2.72152E−02 | −6.12379E−03 |
| A14 = | 7.25566E+00 | 2.42983E−01 | | −5.80568E−03 | 5.74411E−04 |
| A16 = | −2.27229E+00 | | | | |

In the optical image lens system according to the 5th embodiment, the definitions of f, Fno, HFOV, V1, V2, V3, CT1, CT2, CT3, T23, DS11, DS12, R3, R4, R5, R6, f3 and EPD are the same as those stated in the first embodiment with corresponding values for the 5th embodiment. Moreover, these parameters can be calculated from Table 9 and Table 10 as the following values and satisfy the following relationships:

| | |
|---|---|
| f (mm) | 3.42 |
| Fno | 2.54 |
| HFOV (deg.) | 32.4 |
| V1 − V2 − V3 | 7.9 |
| (CT2 + CT3)/T23 | 1.67 |
| (|DS11| + |DS12|)/CT1 | 1.00 |
| R6/R4 | −0.12 |
| (R3 + R4)/(R3 − R4) | −1.12 |
| (R5 + R6)/(R5 − R6) | 0.65 |
| (R3*R6)/(R4*R5) | −0.012 |
| f/f3 | −0.33 |
| f/EPD | 2.54 |

6th Embodiment

Figure 11:
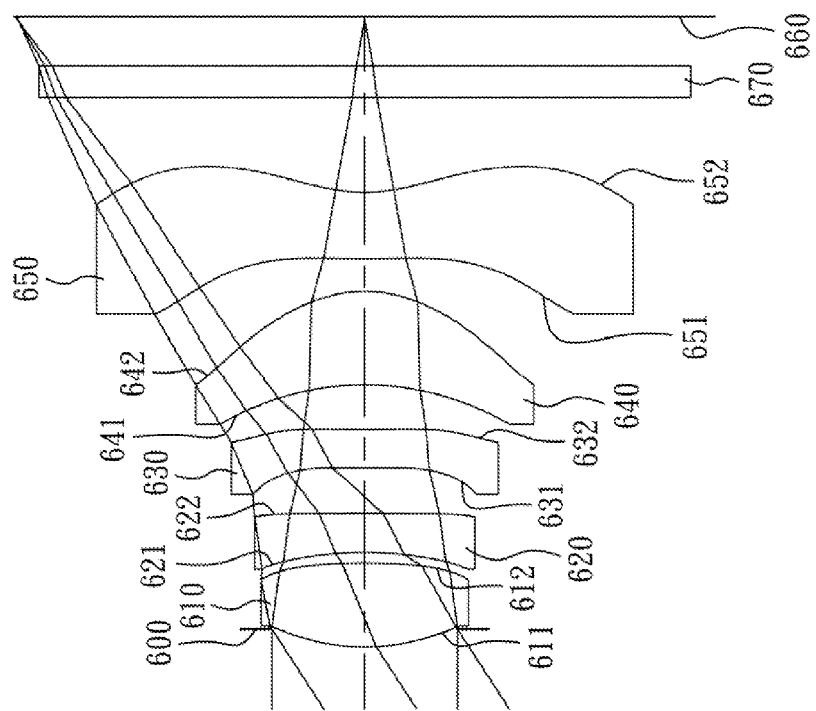
FIG. 11 is a schematic view of an optical image lens system according to the 6th embodiment of the present disclosure.
Figure 12:
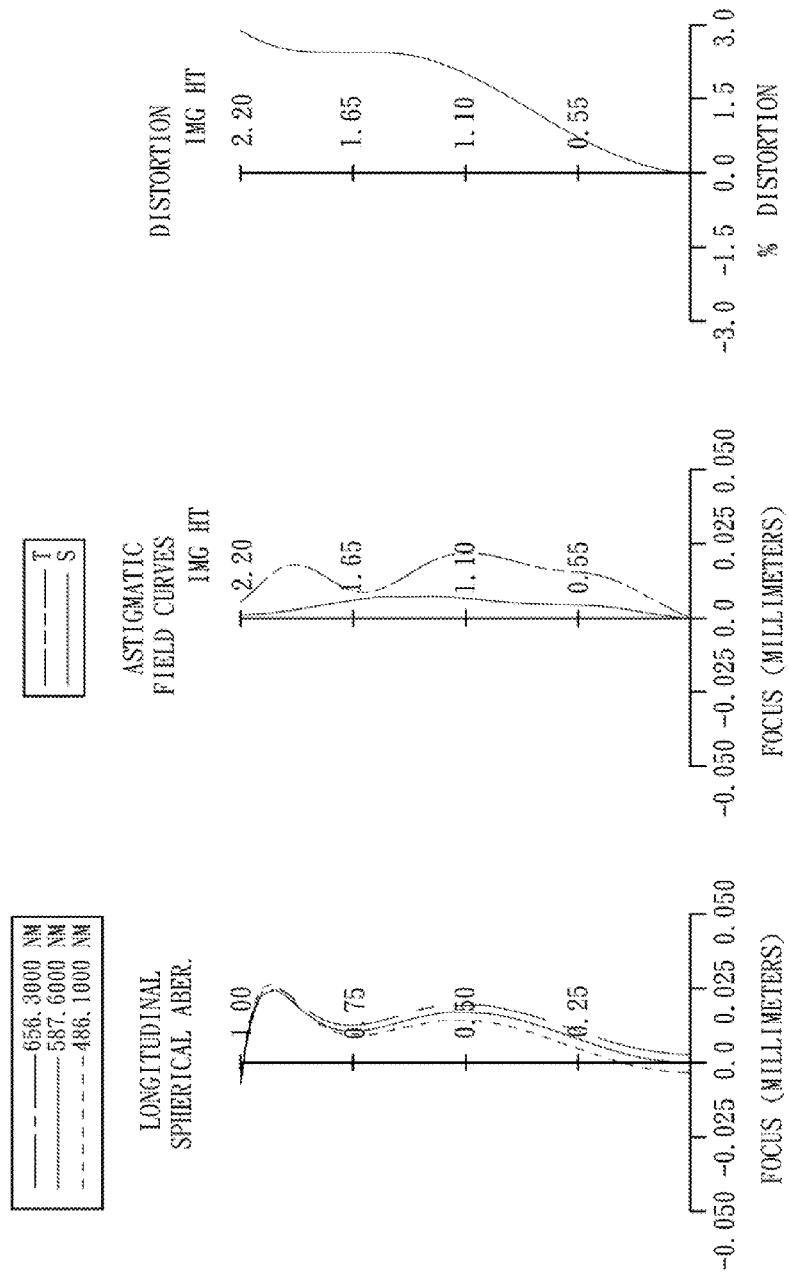
FIG. 12 shows spherical aberration curves, astigmatic field curves and a distortion curve of the optical image lens system according to the 6th embodiment.

FIG. 11 is a schematic view of an optical image lens system according to to the 6th embodiment of the present disclosure. FIG. 12 shows spherical aberration curves, astigmatic field curves and a distortion curve of the optical image lens system according to the 6th embodiment. In FIG. 11, the optical image lens system includes, in order from an object side to an image side, an aperture stop 600, the first lens element 610, the second lens element 620, the third lens element 630, the fourth lens element 640, the fifth lens element 650, an IR-cut filter 670 and an image plane 660.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a convex image-side surface 622, and is made of plastic material. The object-side surface 621 and the image-side surface 622 of the second lens element 620 are aspheric.

The third lens element 630 with negative refractive power has a convex object-side surface 631 and a concave image-side surface 632, and is made of plastic material. The object-side surface 631 and the image-side surface 632 of the third lens element 630 are aspheric, and the third lens element 630 has inflection points formed on the image-side surface 632 thereof. Furthermore, the image-side surface 632 of the third lens element 630 changes from concave to convex, and then changes to concave when away from the paraxial region to the off-axis region thereof. (Please refer to FIG. 17.)

The fourth lens element 640 with positive refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a convex object-side surface 651 and a concave image-side surface 652, and is made of plastic material. The object-side surface 651 and the image-side surface 652 of the fifth lens element 650 are aspheric. Furthermore, the fifth lens element 650 has at least one inflection point formed on the object-side surface 651 and the image-side surface 652 thereof.

The IR-cut filter 670 is made of glass, and located between the fifth lens element 650 and the image plane 660, and will not affect the focal length of the optical image lens system.

The detailed optical data of the 6th embodiment are shown in Table 11 and the aspheric surface data are shown in Table 12 below.

TABLE 11

5th Embodiment
f = 3.27 mm, Fno = 2.80, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.112 | | | | |
| 2 | Lens 1 | 1.330120 (ASP) | 0.533 | Plastic | 1.535 | 56.3 | 1.87 |
| 3 | | −3.428600 (ASP) | 0.068 | | | | |

TABLE 11-continued

5th Embodiment
f = 3.27 mm, Fno = 2.80, HFOV = 33.1 deg.

| Surface # | | Curvature Radius | | Thickness | Material | Index | Abbe # | Focal length |
|---|---|---|---|---|---|---|---|---|
| 4 | Lens 2 | −1.961800 | (ASP) | 0.240 | Plastic | 1.614 | 25.6 | −3.44 |
| 5 | | −28.968700 | (ASP) | 0.292 | | | | |
| 6 | Lens 3 | 22.471900 | (ASP) | 0.240 | Plastic | 1.583 | 30.2 | −22.19 |
| 7 | | 8.182500 | (ASP) | 0.281 | | | | |
| 8 | Lens 4 | −1.742570 | (ASP) | 0.590 | Plastic | 1.535 | 56.3 | 2.25 |
| 9 | | −0.796460 | (ASP) | 0.208 | | | | |
| 10 | Lens 5 | 7.861900 | (ASP) | 0.415 | Plastic | 1.535 | 56.3 | −2.07 |
| 11 | | 0.950350 | (ASP) | 0.600 | | | | |
| 12 | IR-cut filter | Plano | | 0.200 | Glass | 1.517 | 64.2 | — |
| 13 | | Plano | | 0.311 | | | | |
| 14 | Image | Plano | | — | | | | |

Note:
Reference wavelength (d-line) is 587.6 nm

TABLE 12

Aspheric Coefficients

| Surface # | 2 | 3 | 4 | 5 | 6 |
|---|---|---|---|---|---|
| k = | −7.63822E+00 | −2.14420E+01 | −9.13381E+00 | −3.00000E+01 | −3.00000E+01 |
| A4 = | 3.86548E−01 | −5.82201E−02 | 8.25835E−02 | 5.97502E−02 | −7.34152E−01 |
| A6 = | −7.32756E−01 | −3.73868E−01 | −3.43371E−01 | −3.01626E−01 | 8.22841E−01 |
| A8 = | 1.40021E+00 | 1.71368E−01 | 7.35777E−01 | 1.23716E+00 | −4.79086E+00 |
| A10 = | −2.26714E+00 | −5.88116E−01 | −3.59060E+00 | −3.40825E+00 | 1.12293E+01 |
| A12 = | 2.99136E−01 | −2.49120E+00 | 5.14231E+00 | 2.91540E+00 | −9.84283E+00 |
| A14 = | 1.89622E−01 | 1.41639E+00 | −4.51671E+00 | −1.14527E+00 | |

| Surface # | 7 | 8 | 9 | 10 | 11 |
|---|---|---|---|---|---|
| k = | −2.74808E+00 | −1.16251E+01 | −3.67583E+00 | 0.00000E+00 | −6.01808E+00 |
| A4 = | −4.88822E−01 | −2.59046E−01 | −3.74086E−01 | −3.49670E−01 | −2.20257E−01 |
| A6 = | 8.65238E−01 | 5.23260E−01 | 4.72975E−01 | 1.49778E−01 | 1.51627E−01 |
| A8 = | −3.33642E+00 | −1.19947E+00 | −5.72218E−01 | −1.24644E−02 | −8.56666E−02 |
| A10 = | 8.03414E+00 | 1.41969E+00 | 4.20335E−01 | −3.23584E−02 | 3.06676E−02 |
| A12 = | −9.83531E+00 | −5.13982E−01 | −1.04367E−01 | 2.47749E−02 | −6.25686E−03 |
| A14 = | 6.63131E+00 | −1.12810E−01 | | −5.18055E−03 | 5.50505E−04 |
| A16 = | −2.04704E+00 | | | | |

In the optical image lens system according to the 6th embodiment, the definitions of f, Fno, HFOV, V1, V2, V3, CT1, CT2, CT3, T23, DS11, DS12, R3, R4, R5, R6, f3 and EPD are the same as those stated in the first embodiment with corresponding values for the 6th embodiment. Moreover, these parameters can be calculated from Table 11 and Table 12 as the following values and satisfy the following relationships:

| | |
|---|---|
| f (mm) | 3.27 |
| Fno | 2.80 |
| HFOV (deg.) | 33.1 |
| V1 − V2 − V3 | 0.5 |
| (CT2 + CT3)/T23 | 1.64 |
| (|DS11| + |DS12|)/CT1 | 1.00 |
| R6/R4 | −0.28 |
| (R3 + R4)/(R3 − R4) | −1.15 |
| (R5 + R6)/(R5 − R6) | 2.15 |
| (R3*R6)/(R4*R5) | 0.025 |
| f/f3 | −0.15 |
| f/EPD | 2.80 |

7th Embodiment

Figure 13:
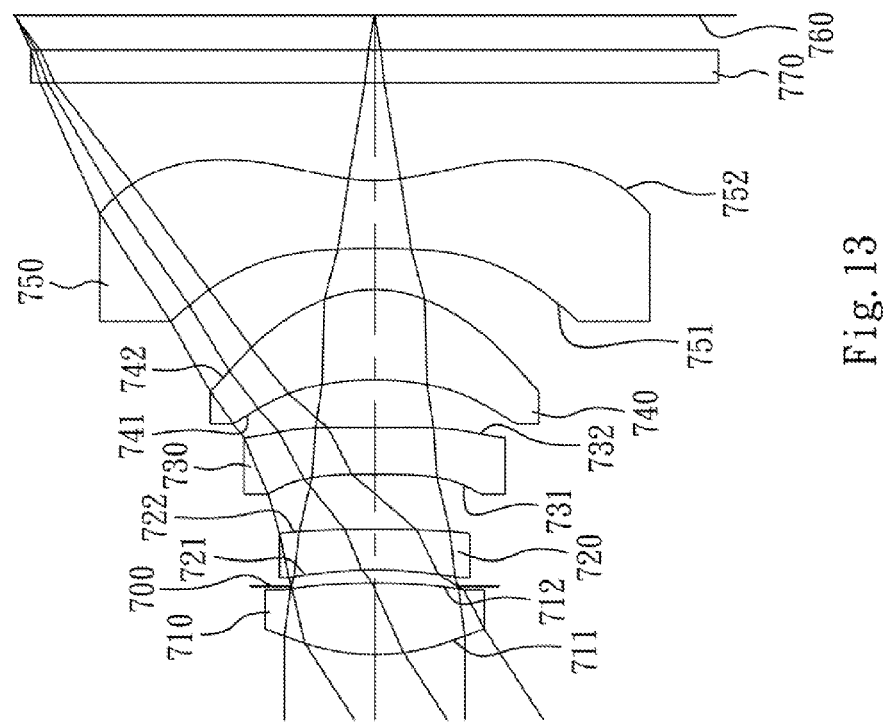
FIG. 13 is a schematic view of an optical image lens system according to the 7th embodiment of the present disclosure.

FIG. 13 is a schematic view of an optical image lens system according to the 7th embodiment of the present disclosure.

Figure 14:
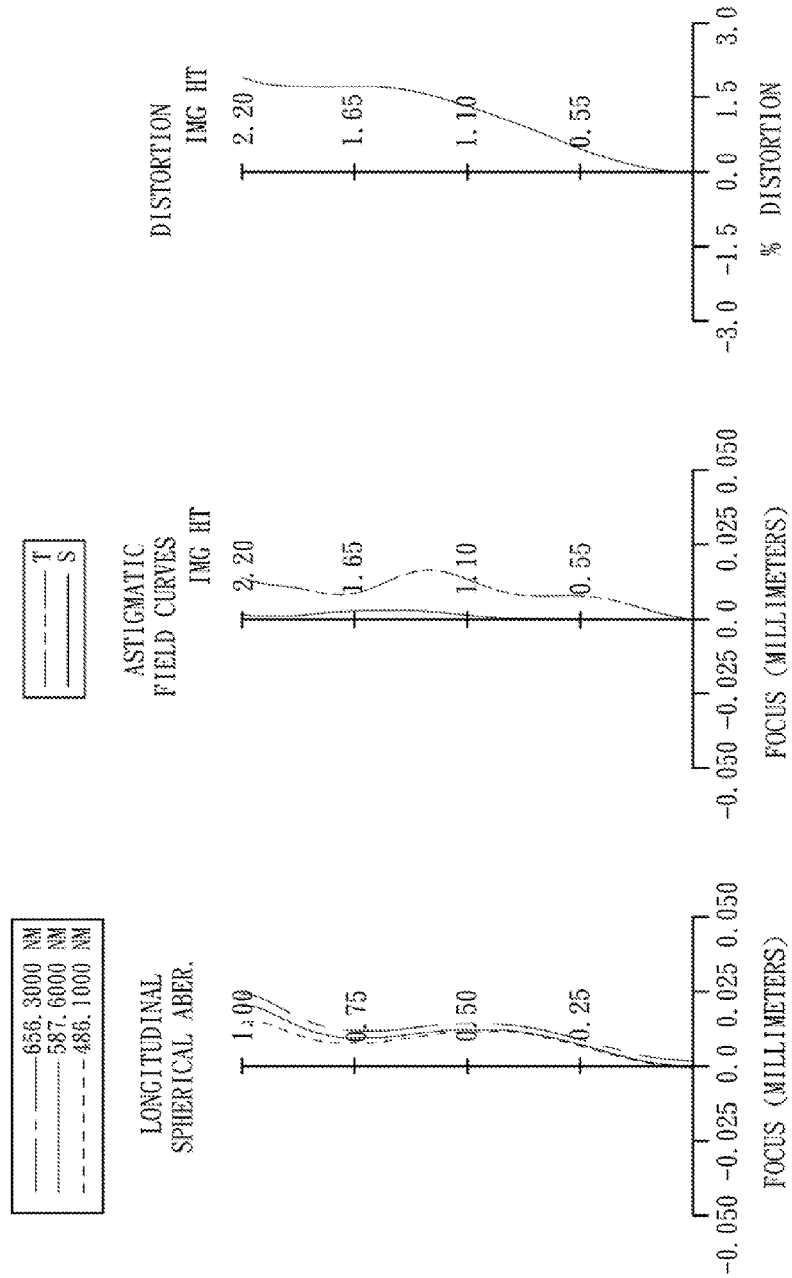
FIG. 14 shows spherical aberration curves, astigmatic field curves and a distortion curve of the optical image lens system according to the 7th embodiment.

FIG. 14 shows spherical aberration curves, astigmatic field curves and a distortion curve of the optical image lens system according to the 7th embodiment. In FIG. 13, the optical image lens system includes, in order from an object side to an image side, the first lens element 710, an aperture stop 700, the second lens element 720, the third lens element 730, the fourth lens element 740, the fifth lens element 750, an IR-cut filter 770 and an image plane 760.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a convex image-side surface 722, and is made of plastic material. The object-side surface 721 and the image-side surface 722 of the second lens element 720 are aspheric.

The third lens element 730 with negative refractive power has a concave object-side surface 731 and a concave image-side surface 732, and is made of plastic material. The object-side surface 731 and the image-side surface 732 of the third lens element 730 are aspheric, and the third lens element 730 has inflection points formed on the image-side surface 732 thereof. Furthermore, the image-side surface 732 of the third lens element 730 changes from concave to convex, and then changes to concave again when away from the paraxial region to the off-axis region thereof. (Please refer to FIG. 17.)

The fourth lens element 740 with positive refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a concave object-side surface 751 and a concave image-side surface 752, and is made of plastic material. The object-side surface 751 and the image-side surface 752 of the fifth lens element 750 are aspheric. Furthermore, the fifth lens element 750 has at least one inflection point formed on the object-side surface 751 and the image-side surface 752 thereof.

The IR-cut filter 770 is made of glass, and located between the fifth lens element 750 and the image plane 760, and will not affect the focal length of the optical image lens system.

The detailed optical data of the 7th embodiment are shown in Table 13 and the aspheric surface data are shown in Table 14 below.

In the optical image lens system according to the 7th embodiment, the definitions of f, Fno, HFOV, V1, V2, V3, CT1, CT2, CT3, T23, DS11, DS12, R3, R4, R5, R6, f3 and EPD are the same as those stated in the first embodiment with corresponding values for the 7th embodiment. Moreover, these parameters can be calculated from Table 13 and Table 14 as the following values and satisfy the following relationships:

| | |
|---|---|
| f (mm) | 3.31 |
| Fno | 3.00 |
| HFOV (deg.) | 33.1 |
| V1 − V2 − V3 | 10.1 |
| (CT2 + CT3)/T23 | 1.55 |
| (|DS11| + |DS12|)/CT1 | 1.00 |
| R6/R4 | −1.11 |
| (R3 + R4)/(R3 − R4) | −1.64 |
| (R5 + R6)/(R5 − R6) | 0.11 |
| (R3*R6)/(R4*R5) | −0.193 |
| f/f3 | −0.34 |
| f/EPD | 3.00 |

TABLE 13

7th Embodiment
f = 3.31 mm, Fno = 3.00, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.310850 (ASP) | 0.442 | Plastic | 1.514 | 56.8 | 1.99 |
| 2 | | −4.076200 (ASP) | −0.020 | | | | |
| 3 | Ape. Stop | Plano | 0.100 | | | | |
| 4 | Lens 2 | −2.446000 (ASP) | 0.245 | Plastic | 1.640 | 23.3 | −5.11 |
| 5 | | −10.101000 (ASP) | 0.340 | | | | |
| 6 | Lens 3 | −14.061700 (ASP) | 0.283 | Plastic | 1.633 | 23.4 | −9.80 |
| 7 | | 11.189400 (ASP) | 0.295 | | | | |
| 8 | Lens 4 | −1.855740 (ASP) | 0.550 | Plastic | 1.530 | 55.8 | 2.08 |
| 9 | | −0.762590 (ASP) | 0.255 | | | | |
| 10 | Lens 5 | −7.275800 (ASP) | 0.413 | Plastic | 1.530 | 55.8 | −1.77 |
| 11 | | 1.096930 (ASP) | 0.600 | | | | |
| 12 | IR-cut filter | Plano | 0.200 | Glass | 1.517 | 64.2 | — |
| 13 | | Plano | 0.213 | | | | |
| 14 | Image | Plano | — | | | | |

Note:
Reference wavelength (d-line) is 587.6 nm

TABLE 14

Aspheric Coefficients

| Surface # | 1 | 2 | 4 | 5 | 6 |
|---|---|---|---|---|---|
| k = | −8.77105E+00 | −1.13116E+01 | −3.74458E+00 | 3.55924E−15 | −1.05604E+00 |
| A4 = | 4.38208E−01 | −4.53144E−02 | 7.02633E−02 | −7.16653E−02 | −7.23848E−01 |
| A6 = | −8.89115E−01 | 2.16000E−02 | 1.79622E−01 | 7.52481E−02 | 8.64379E−01 |
| A8 = | 1.37276E+00 | −6.74127E−01 | −3.04547E−01 | 3.40572E−01 | −4.16330E+00 |
| A10 = | −1.90471E+00 | 1.48864E+00 | −1.15662E+00 | −2.23739E+00 | 1.07077E+01 |
| A12 = | 2.99002E−01 | −2.49119E+00 | 5.14232E+00 | 2.91541E+00 | −9.84271E+00 |
| A14 = | 1.89330E−01 | 1.41640E+00 | −4.51670E+00 | −1.14526E+00 | |

| Surface # | 7 | 8 | 9 | 10 | 11 |
|---|---|---|---|---|---|
| k = | −2.70479E+01 | −6.39098E+00 | −3.21139E+00 | −2.60822E+01 | −7.72773E+00 |
| A4 = | −5.30665E−01 | −2.93797E−01 | −3.95754E−01 | −2.92312E−01 | −2.18602E−01 |
| A6 = | 1.01036E+00 | 3.74082E−01 | 4.62806E−01 | 1.45480E−01 | 1.56041E−01 |
| A8 = | −3.25401E+00 | −1.23422E+00 | −6.27331E−01 | −2.20558E−02 | −8.89911E−02 |
| A10 = | 7.90551E+00 | 1.63687E+00 | 4.14720E−01 | −3.67585E−02 | 3.07823E−02 |
| A12 = | −9.77023E+00 | −3.35134E−01 | −5.95520E−02 | 2.48943E−02 | −6.03298E−03 |
| A14 = | 6.63087E+00 | −2.92172E−01 | | −3.86527E−03 | 5.00638E−04 |
| A16 = | −2.13177E+00 | | | | |

8th Embodiment

Figure 15:
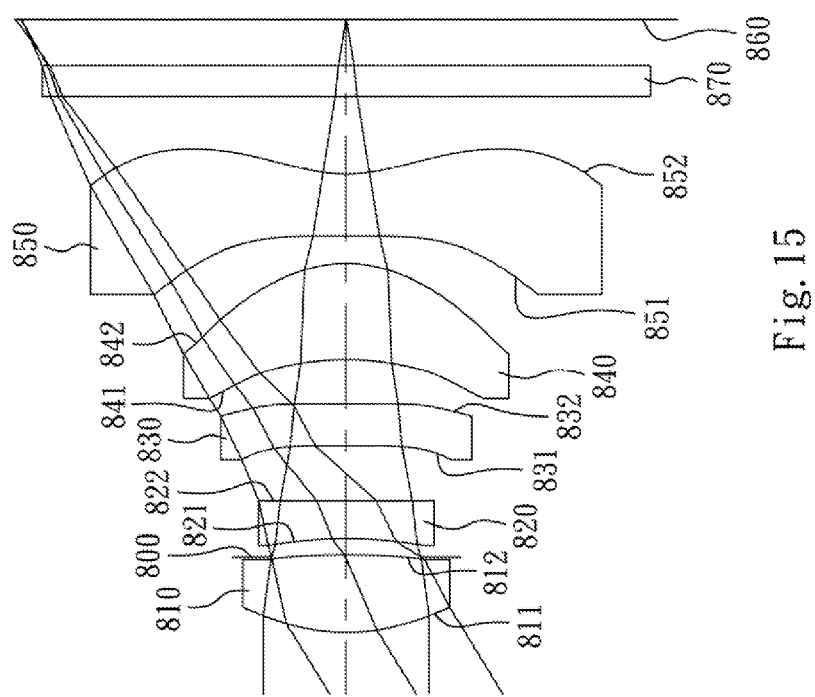
FIG. 15 is a schematic view of an optical image lens system according to the 8th embodiment of the present disclosure.
Figure 16:
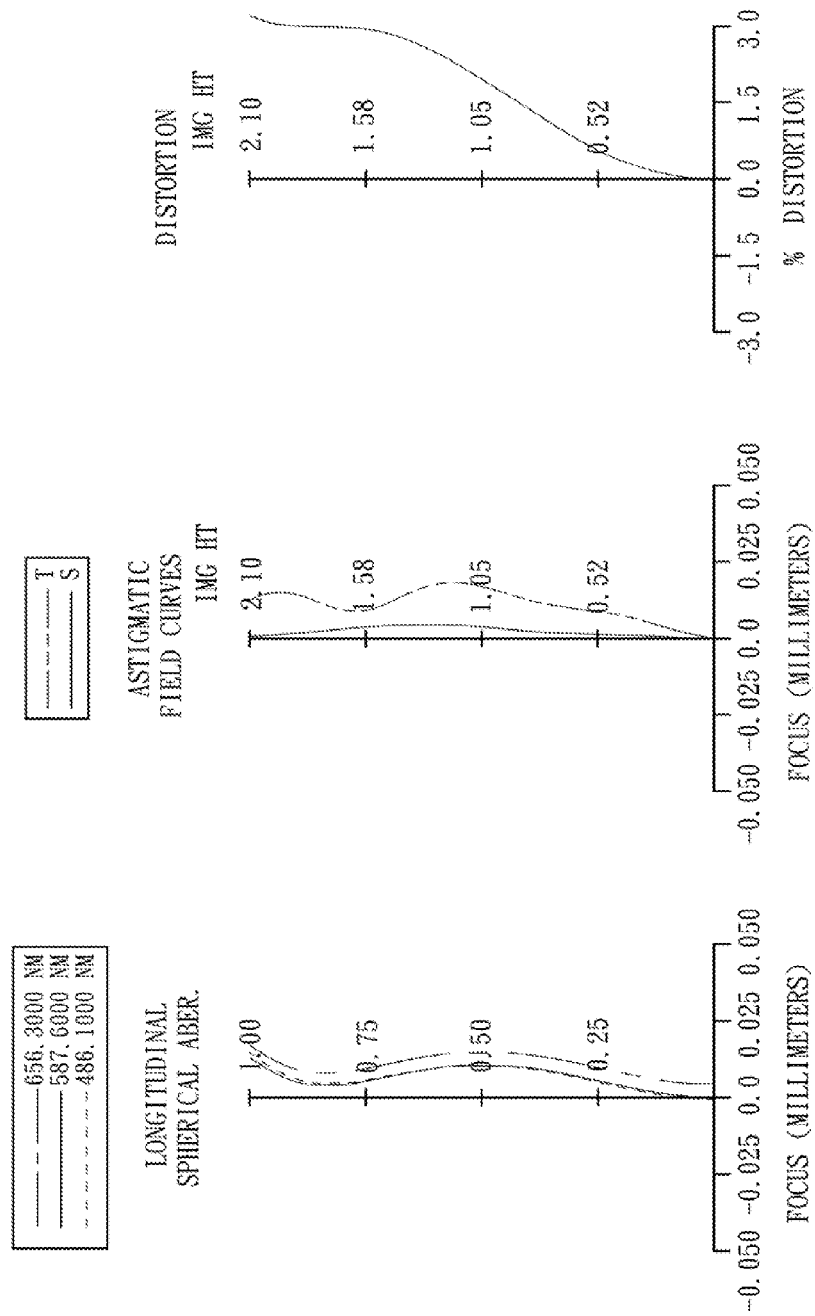
FIG. 16 shows spherical aberration curves, astigmatic field curves and a distortion curve of the optical image lens system according to the 8th embodiment.

FIG. 15 is a schematic view of an optical image lens system according to the 8th embodiment of the present disclosure. FIG. 16 shows spherical aberration curves, astigmatic field curves and a distortion curve of the optical image lens system according to the 8th embodiment. In FIG. 15, the optical image lens system includes, in order from an object side to an image side, the first lens element 810, an aperture stop 800, the second lens element 820, the third lens element 830, the fourth lens element 840, the fifth lens element 850, an IR-cut filter 870 and an image plane 860.

The first lens element 810 with positive refractive power has a convex object-side surface 811 and a convex image-side surface 812, and is made of plastic material. The object-side surface 811 and the image-side surface 812 of the first lens element 810 are aspheric.

The second lens element 820 with negative refractive power has a concave object-side surface 821 and a convex image-side surface 822, and is made of plastic material. The object-side surface 821 and the image-side surface 822 of the second lens element 820 are aspheric.

The third lens element 830 with negative refractive power has a convex object-side surface 831 and a concave image-side surface 832, and is made of plastic material. The object-side surface 831 and the image-side surface 832 of the third lens element 830 are aspheric, and the third lens element 830 has inflection points formed on the image-side surface 832 thereof. Furthermore, the image-side surface 832 of the third lens element 830 changes from concave to convex, and then changes to concave again when away from the paraxial region to the off-axis region thereof. (Please refer to FIG. 17.)

The fourth lens element 840 with positive refractive power has a concave object-side surface 841 and a convex image-side surface 842, and is made of plastic material. The object-side surface 841 and the image-side surface 842 of the fourth lens element 840 are aspheric.

The fifth lens element 850 with negative refractive power has a convex object-side surface 851 and a concave image-side surface 852, and is made of plastic material. The object-side surface 851 and the image-side surface 852 of the fifth lens element 850 are aspheric. Furthermore, the fifth lens element 850 has at least one inflection point formed on the object-side surface 851 and the image-side surface 852 thereof.

The IR-cut filter 870 is made of glass, and located between the fifth lens element 850 and the image plane 860, and will not affect the focal length of the optical image lens system.

The detailed optical data of the 8th embodiment are shown in Table 15 and the aspheric surface data are shown in Table 16 below.

TABLE 15

8th Embodiment
f = 3.32 mm, Fno = 3.10, HFOV = 31.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.322350 | (ASP) | 0.503 | Plastic | 1.535 | 56.3 | 2.05 |
| 2 | | −5.498600 | (ASP) | −0.015 | | | | |
| 3 | Ape. Stop | Plano | | 0.121 | | | | |
| 4 | Lens 2 | −2.507770 | (ASP) | 0.240 | Plastic | 1.650 | 21.4 | −4.24 |
| 5 | | −28.968700 | (ASP) | 0.358 | | | | |
| 6 | Lens 3 | 17.929700 | (ASP) | 0.268 | Plastic | 1.543 | 56.5 | −46.35 |
| 7 | | 10.418300 | (ASP) | 0.288 | | | | |
| 8 | Lens 4 | −1.938730 | (ASP) | 0.623 | Plastic | 1.535 | 56.3 | 2.11 |
| 9 | | −0.792780 | (ASP) | 0.176 | | | | |
| 10 | Lens 5 | 46.011100 | (ASP) | 0.399 | Plastic | 1.535 | 56.3 | −1.76 |
| 11 | | 0.918310 | (ASP) | 0.500 | | | | |
| 12 | IR-cut filter | Plano | | 0.200 | Glass | 1.517 | 64.2 | — |
| 13 | | Plano | | 0.299 | | | | |
| 14 | Image | Plano | | — | | | | |

Note:
Reference wavelength (d-line) is 587.6 nm

TABLE 16

Aspheric Coefficients

| Surface # | 1 | 2 | 4 | 5 | 6 |
|---|---|---|---|---|---|
| k = | −8.21187E+00 | −8.87350E−16 | −1.76278E+00 | −3.00000E+01 | −3.00000E+01 |
| A4 = | 4.10007E−01 | −8.50794E−02 | 6.02499E−02 | 4.09424E−02 | −5.93832E−01 |
| A6 = | −7.58918E−01 | 5.71827E−02 | 3.37999E−01 | 2.60081E−01 | 9.72833E−01 |
| A8 = | 1.27441E+00 | −5.64226E−01 | −6.14615E−01 | 5.92628E−02 | −4.41815E+00 |
| A10 = | −1.78036E+00 | 7.41420E−01 | −1.87363E+00 | −2.29198E+00 | 1.05149E+01 |
| A12 = | 2.98998E−01 | −2.49120E+00 | 5.14231E+00 | 2.91540E+00 | −9.84272E+00 |
| A14 = | 1.89325E−01 | 1.41639E+00 | −4.51671E+00 | −1.14527E+00 | |

| Surface # | 7 | 8 | 9 | 10 | 11 |
|---|---|---|---|---|---|
| k = | −9.87308E+00 | −1.27617E+01 | −3.91237E+00 | −3.00000E+01 | −6.59885E+00 |
| A4 = | −4.74823E−01 | −2.98575E−01 | −3.42089E−01 | −3.38213E−01 | −2.17684E−01 |
| A6 = | 9.14061E−01 | 3.92768E−01 | 4.23702E−01 | 1.58602E−01 | 1.57070E−01 |
| A8 = | −3.39494E+00 | −1.22136E+00 | −5.88868E−01 | −1.99819E−02 | −8.90014E−02 |
| A10 = | 7.93534E+00 | 1.57501E+00 | 4.26746E−01 | −3.57046E−02 | 3.06607E−02 |
| A12 = | −9.73312E+00 | −3.97726E−01 | −8.87733E−02 | 2.54819E−02 | −6.03760E−03 |

TABLE 16-continued

Aspheric Coefficients

| A14 = | 6.66143E+00 | −1.69317E−01 | −4.56303E−03 | 5.18027E−04 |
|---|---|---|---|---|
| A16 = | −2.11102E+00 | | | |

In the optical image lens system according to the 8th embodiment, the definitions of f, Fno, HFOV, V1, V2, V3, CT1, CT2, CT3, T23, DS11, DS12, R3, R4, R5, R6, f3 and EPD are the same as those stated in the first embodiment with corresponding values for the 8th embodiment. Moreover, these parameters can be calculated from Table 15 and Table 16 as the following values and satisfy the following relationships:

| f (mm) | 3.32 |
|---|---|
| Fno | 3.10 |
| HFOV (deg.) | 31.5 |
| V1 − V2 − V3 | −21.6 |
| (CT2 + CT3)/T23 | 1.42 |
| (|DS11| + |DS12|)/CT1 | 1.00 |
| R6/R4 | −0.36 |
| (R3 + R4)/(R3 − R4) | −1.19 |
| (R5 + R6)/(R5 − R6) | 3.77 |
| (R3*R6)/(R4*R5) | 0.050 |
| f/f3 | −0.07 |
| f/EPD | 3.10 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image lens system comprising, in order from an object side to an image side:
   a first lens element with positive refractive power having a convex object-side surface;
   a second lens element with negative refractive power having a concave object-side surface and a convex image-side surface;
   a third lens element with negative refractive power having a concave image-side surface;
   a fourth lens element with refractive power having a concave object-side surface and a convex image-side surface, wherein the object-side surface and the image-side surface of the fourth lens element are aspheric; and
   a fifth lens element with negative refractive power having a concave image-side surface, wherein an object-side surface and the image-side surface of the fifth lens element are aspheric, and the fifth lens element has at least one inflection point formed on at least one of the object-side surface and the image-side surface thereof;
   wherein a curvature radius of the object-side surface of the third lens element is R5, a curvature radius of the image-side surface of the third lens element is R6, a central thickness of the second lens element is CT2, a central thickness of the third lens element is CT3, and an axial distance between the second lens element and the third lens element is T23, the following relationships are satisfied:

$0<(R5+R6)/(R5-R6)<5.0$; and $0.5<(CT2+CT3)/T23<2.5$.

2. The optical image lens system of claim 1, wherein the fourth lens element has positive refractive power, and the fifth lens element is made of plastic material.

3. The optical image lens system of claim 2, wherein the curvature radius of the object-side surface of the third lens element is R5, and the curvature radius of the image-side surface of the third lens element is R6, the following relationship is satisfied:

$0<(R5+R6)/(R5-R6)<3.0$.

4. The optical image lens system of claim 3, wherein the third lens element has a concave object-side surface, the curvature radius of the object-side surface of the third lens element is R5, and the curvature radius of the image-side surface of the third lens element is R6, the following relationship is satisfied:

$0<(R5+R6)/(R5-R6)<1.0$.

5. The optical image lens system of claim 4, further comprising:
   a stop, wherein an axial distance from the stop to the object-side surface of the first lens element is DS11, an axial distance from the stop to an image-side surface of the first lens element is DS12, and a central thickness of the first lens element is CT1, the following relationship is satisfied:

$(|DS11|+|DS12|)/CT1<1.1$.

6. The optical image lens system of claim 4, wherein a curvature radius of the object-side surface of the second lens element is R3, and a curvature radius of the image-side surface of the second lens element is R4, the following relationship is satisfied:

$-2.0<(R3+R4)/(R3-R4)<-1.0$.

7. The optical image lens system of claim 2, wherein a focal length of the optical image lens system is f, and a focal length of the third lens element is f3, the following relationship is satisfied:

$0.8<f/f3<0$.

8. The optical image lens system of claim 7, wherein the focal length of the optical image lens system is f, and a diameter of an entrance pupil of the optical image lens system is EPD, the following relationship is satisfied:

$2.2<f/EPD<3.4$.

9. The optical image lens system of claim 7, wherein a curvature radius of the object-side surface of the second lens element is R3, a curvature radius of the image-side surface of the second lens element is R4, the curvature radius of the object-side surface of the third lens element is R5, and the curvature radius of the image-side surface of the third lens element is R6, the following relationship is satisfied:

$-1.0<(R3 \times R6)/(R4 \times R5)<0$.

10. The optical image lens system of claim 7, wherein an Abbe number of the first lens element is V1, an Abbe number of the second lens element is V2, and an Abbe number of the third lens element is V3, the following relationship is satisfied:

$0<V1-V2-V3<40$.

11. The optical image lens system of claim 7, wherein the image-side surface of the third lens element changes from concave at the paraxial region to convex when away from the paraxial region.

12. The optical image lens system of claim 11, wherein the image-side surface of the third lens element changes from concave at the paraxial region to convex and concave again when away from the paraxial region.

13. The optical image lens system of claim 11, further comprising:
a stop, wherein an axial distance from the stop to the object-side surface of the first lens element is DS11, an axial distance from the stop to an image-side surface of the first lens element is DS12, a central thickness of the first lens element is CT1, a central thickness of the second lens element is CT2, a central thickness of the third lens element is CT3, and an axial distance between the second lens element and the third lens element is T23, the following relationships are satisfied:

(|DS11|+|DS12|)/CT1<1.1; and 1.0<(CT2+CT3)/T23<2.0.

14. The optical image lens system of claim 11, wherein the focal length of the optical image lens system is f, and the focal length of the third lens element is f3, the following relationship is satisfied:

−0.6<f/f3<0.

15. The optical image lens system of claim 14, wherein a curvature radius of the image-side surface of the second lens element is R4, and the curvature radius of the image-side surface of the third lens element is R6, the following relationship is satisfied:

−1.7<R6/R4<0.

16. An optical image lens system comprising, in order from an object side to an image side:
a first lens element with positive refractive power having a convex object-side surface;
a second lens element with negative refractive power having a concave object-side surface and a convex image-side surface;
a third lens element with negative refractive power having a concave object-side surface and a concave image-side surface, wherein the object-side surface and the image-side surface of the third lens element are aspheric;
a fourth lens element with refractive power made of plastic material, wherein an object-side surface and an image-side surface of the fourth lens element are aspheric; and
a fifth lens element with negative refractive power having a concave image-side surface, and made of plastic material, wherein an object-side surface and the image-side surface of the fifth lens element are aspheric, and the fifth lens element has at least one inflection point formed on at least one of the object-side surface and the image-side surface thereof;
wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, a central thickness of the second lens element is CT2, a central thickness of the third lens element is CT3, and an axial distance between the second lens element and the third lens element is T23, the following relationships are satisfied:

0<(R5+R6)/(R5−R6)<1.0;

0.5<(CT2+CT3)/T23<2.5; and

−1.0<(R3×R6)/(R4×R5)<0.

17. The optical image lens system of claim 16, wherein a focal length of the optical image lens system is f, and a focal length of the third lens element is f3, the following relationship is satisfied:

−0.8<f/f3<0.

18. The optical image lens system of claim 17, wherein the fourth lens element has a convex image-side surface.

19. The optical image lens system of claim 18, further comprising:
a stop, wherein an axial distance from the stop to the object-side surface of the first lens element is DS11, an axial distance from the stop to an image-side surface of the first lens element is DS12, and a central thickness of the first lens element is CT1, the following relationship is satisfied:

(|DS11|+|DS12|)CT1<1.1.

20. The optical image lens system of claim 18, wherein the curvature radius of the image-side surface of the second lens element is R4, and the curvature radius of the image-side surface of the third lens element is R6, the following relationship is satisfied:

−1.7<R6/R4<0.

21. The optical image lens system of claim 18, wherein the curvature radius of the object-side surface of the second lens element is R3, and the curvature radius of the image-side surface of the second lens element is R4, the following relationship is satisfied:

−2.0<(R3+R4)/(R3−R4)<−1.0.

22. The optical image lens system of claim 21, wherein an Abbe number of the first lens element is V1, an Abbe number of the second lens element is V2, and an Abbe number of the third lens element is V3, the following relationship is satisfied:

0<V1−V2−V3<40.

23. The optical image lens system of claim 16, wherein the image-side surface of the third lens element changes from concave at the paraxial region to convex when away from the paraxial region.

* * * * *

UNITED STATES PATENT AND TRADEMARK OFFICE
CERTIFICATE OF CORRECTION

PATENT NO.        : 8,514,501 B2                                              Page 1 of 1
APPLICATION NO.   : 13/584778
DATED             : August 20, 2013
INVENTOR(S)       : Chun-Shan Chen, Tsung-Han Tsai and Hsin-Hsuan Huang It is certified that error appears in the above-identified patent and that said Letters Patent is hereby corrected as shown below:

In the Claims

Column 28, line 46

The relationship appearing in claim 7 of the issued patent $0.8 < f/f3 < 0.$   should read   $-0.8 < f/f3 < 0.$ Signed and Sealed this
Twentieth Day of May, 2014

Michelle K. Lee
*Deputy Director of the United States Patent and Trademark Office*